(12) United States Patent
Qu et al.

(10) Patent No.: US 11,513,043 B2
(45) Date of Patent: Nov. 29, 2022

(54) DOUBLE CANTILEVER BEAM-ENCODING LEAD SCREW COMBINED SENSING TENSILE TEST METHOD AND MACHINE

(71) Applicant: Yantai University, Shandong (CN)

(72) Inventors: Shuying Qu, Shandong (CN); Jianglong Wu, Shandong (CN); Yang Lu, Shandong (CN)

(73) Assignee: YANTAI UNIVERSITY, Shandong (CN)

( * ) Notice: Subject to any disclaimer, the term of this patent is extended or adjusted under 35 U.S.C. 154(b) by 174 days.

(21) Appl. No.: 16/986,711

(22) Filed: Aug. 6, 2020

(65) Prior Publication Data

US 2021/0072128 A1 Mar. 11, 2021

(30) Foreign Application Priority Data

Sep. 9, 2019 (CN) .......................... 201910846012.9

(51) Int. Cl.
*G06F 30/392* (2020.01)
*G06F 30/39* (2020.01)
*G01N 3/02* (2006.01)
*G01N 3/08* (2006.01)
*G01N 3/62* (2006.01)

(52) U.S. Cl.
CPC ................ *G01N 3/02* (2013.01); *G01N 3/08* (2013.01); *G01N 3/62* (2013.01); *G01N 2203/0017* (2013.01)

(58) Field of Classification Search
CPC .. G01N 3/02; G01N 3/08; G01N 3/62; G01N 3/066; G01N 3/00; G01N 3/20; G01B 7/12; G01B 7/06; G01B 21/08; G01B 5/02; G01B 7/18; B25J 13/085; B25J 15/0253; G01L 5/0019; G01C 9/00; G01M 13/021
See application file for complete search history.

(56) References Cited

U.S. PATENT DOCUMENTS

| | | | | |
|---|---|---|---|---|
| 6,205,862 B1* | 3/2001 | Nakamura | ............... | G01N 3/00 73/796 |
| 7,681,459 B1* | 3/2010 | Yang | ........................ | G01N 3/08 73/856 |
| 2015/0268115 A1* | 9/2015 | Robert | .................. | B81B 3/0021 73/718 |
| 2018/0164164 A1* | 6/2018 | Li | ........................ | G01L 5/0047 |

\* cited by examiner

*Primary Examiner* — Brandi N Hopkins
(74) *Attorney, Agent, or Firm* — Tutunjian & Bitetto, P.C.

(57) ABSTRACT

The present invention discloses a double cantilever beam-encoding lead screw combined sensing tensile test method and machine. The double cantilever beam-encoding lead screw combined sensing tensile test machine comprises a main frame, a standard, a test piece and a microcomputer numerical control unit. The main frame is a force-deformation combined sensing mechanism composed of a double cantilever beam sensor, an encoding lead screw and a drive device. The double cantilever beam sensor is composed of a fixed cantilever beam sensor and a movable cantilever beam sensor. The encoding lead screw is composed of a drive lead screw and a tristate encoder. The double cantilever beam sensor matches with the encoding lead screw to achieve three functions, namely, test piece clamping, force sensing and deformation sensing, as well as to measure the size of the test piece.

1 Claim, 7 Drawing Sheets

DOUBLE CANTILEVER BEAM-ENCODING LEAD SCREW COMBINED SENSING TENSILE TEST METHOD AND MACHINE

CROSS-REFERENCE TO RELATED APPLICATION

This application claims priority from Chinese patent application No. 201910846012. 9, filed Sep. 9, 2019 and Chinese patent application No. 110567807.A, filed Dec. 13, 2019 which are hereby incorporated by reference herein for all purposes.

TECHNICAL FIELD

The present invention discloses a double cantilever beam-encoding lead screw combined sensing tensile test method and machine, which are applied to the mechanical performance test of materials, especially, the tensile test of materials such as metal filaments, fabric fibers, animal fibers, artificial fibers, high molecular materials and the like. The present invention belongs to the fields of mechanical tests and sensor technologies.

BACKGROUND

In the tensile mechanical performance test of materials, the utilized various structures and forms of material test machines achieve the load measurement and the deformation measurement generally by respectively utilizing two different sensing systems. The two sensing systems are a load sensing system and a deformation sensing system, wherein the loading sensing system utilizes a load (force) sensor, and the deformation sensing system utilizes an extensometer or another mechanical-geometric transformation mechanism. However, there are some materials, such as metal filaments, fibers, flexible high molecular materials and the like, which are not suitable for the extensometer; so, the tensile test of these materials generally utilizes the cross beam of the test machine to measure the deformation amount of a test piece, specifically, the displacement of the cross beam is utilized as the elongation of the test piece. When the deformation is measured by the cross beam, the self bending deformation of the cross beam may introduce the error to influence the measurement precision; so, it requires that the rigidity of a loading structure is as high as possible. Actually, the existing test machine is generally designed to require that the rigidity of the loading structure is as high as possible, and such test machine may be called the rigid test machine. When the elongation of the test piece is measured by the displacement of the cross beam, besides the deformation of the cross beam, an initial space determining (measuring) method of a test piece clamper and a mechanical space of a clamping mechanism also cause the measurement errors. These three errors are from the structure of the cross beam or from the structure of the clampers. Therefore, to overcome the above defects, the structure of the test machine and the loading test manner should be changed.

SUMMARY

The objective of the present invention is to propose a double cantilever beam-encoding lead screw combined sensing tensile test method and machine for the tensile mechanical performance test of materials, including metal filaments, high molecular materials such as plastic, rubber, and the like, artificial fibers, plant fibers, animal fibers, etc. In the test machine, a load sensor and a deformation sensor are integrated, and the test machine has flexible loading and flexible measurement performances.

According to the double cantilever beam-encoding lead screw combined sensing tensile test method and machine of the present invention, a test system comprises a main frame, a standard, a test piece and a numerical control unit (data acquisition-analysis-process-control unit).

The main frame comprises a base, a support plate, a force-deformation combined sensing mechanism, a drive device and a cross-section measuring and locating support.

The base has a box-shaped structure, the upper surface of a top plate of the base is flat, a sliding bearing is arranged at the center of the top plate, the axis of the sliding bearing is in the vertical direction, and four threaded holes are symmetrically distributed around the sliding bearing. The support plate is a trapezoid thick plate vertically fixed to the upper portion of the top plate of the base, and its right end is close to the right end of the base. The middle surface, namely, a longitudinal symmetry plane, of the support plate is vertical to the right side face of the base and passes through the axis of the sliding bearing. The top of the support plate has a horizontal protruded platform extending to the left side, a bearing hole is machined in the protruded platform, and the axis of the bearing hole is superposed with the axis of the sliding bearing. A U-shaped guide slot is machined in the left side of the support plate in the vertical direction.

The force-deformation combined sensing mechanism comprises a force sensing mechanism and a deformation sensing mechanism. The force sensing mechanism comprises a drive lead screw and a double cantilever beam sensor. The deformation sensing mechanism comprises an encoding lead screw and the double cantilever beam sensor. The encoding lead screw comprises the drive lead screw and a tristate encoder. The drive lead screw is commonly used by the force sensing mechanism and the deformation sensing mechanism, and so the double cantilever beam sensor is. The structure of the drive lead screw is divided into four sections, namely $z_1$, $z_2$, $z_3$, and $z_4$, from top to bottom; section $z_1$ is the first unthreaded shaft, section $z_2$ is a threaded rod, section $z_3$ is a protruded step, and section $z_4$ is the second unthreaded shaft. The drive lead screw is mounted on the base through the matching of the first unthreaded shaft and the hearing hole, the rotary sliding matching of the lower end face of the step and the upper end face of the sliding bearing, the matching of the second unthreaded shaft and the sliding bearing, the hole-axis interference fit of a guard disc and the second unthreaded shaft, and the rotary sliding matching of the upper end face of the guard disc and the lower end face of the sliding bearing. The double cantilever beam sensor comprises a fixed cantilever beam sensor and a movable cantilever beam sensor. The fixed cantilever beam sensor comprises a variable-section elastic beam, an upward lower jaw mounted at the free end of the variable-section elastic beam, a lower clamping blade block protruded upwards and embedded in the right side of the lower jaw, uniaxial resistance strain gauges $R_1$ and $R_2$ respectively adhered to the upper side surface and the lower side surface close to the root of the cantilever beam, and a root round hole. The movable cantilever beam sensor comprises a variable-section elastic beam, a downward upper jaw mounted at the free end of the variable-section elastic beam, an upper clamping blade block protruded downwards and embedded in the right side of the upper jaw, two uniaxial resistance strain gauges $R_3$ and $R_5$ adhered to the lower side surface close to the root of the cantilever beam, and two uniaxial resistance strain gauges $R_4$ and $R_6$ adhered to the upper side surface close to the root of the cantilever beam, a drive nut with internal threads embedded in the root of the cantilever beam in an interference fit manner, and a cylindrical limit pin. The gate axes of the resistance strain gauges $R_1$, $R_2$, $R_3$, $R_4$, $R_5$, and $R_6$ are parallel with the axes of the located cantilever beams. The root of the fixed cantilever beam sensor is fixedly connected with the left lower portion of the support plate; meanwhile, the drive lead screw penetrates through the round hole at the root of the fixed cantilever beam sensor, a certain space exists between the drive lead screw and the round hole, and the drive lead screw and the round hole are not in contact. The movable cantilever beam sensor is mounted on the drive lead screw through the matching of the drive nut and the threaded rod and the sliding matching of the limit pin and the U-shaped guide slot of the support plate. The fixed cantilever beam sensor and the movable cantilever beam sensor are symmetrically arranged. The variable-section elastic beam of the fixed cantilever beam sensor and the variable-section elastic beam of the movable cantilever beam sensor have the same shape, size and material, the cross section of the beam is rectangular, the beam is divided into a rigid section ab and a flexible section bc from the free end a to the root c, the width of the rigid section ab and the width of the flexible section bc are the same, and the height H of the rigid section ab is larger than the height h of the flexible section bc. The lower jaw and the upper jaw have the same structure, their positions are symmetrical, the lower jaw is formed by two lower L-shaped clamping blocks and two lower locking screws, and the upper jaw is formed by two upper L-shaped clamping blocks and two upper locking screws. The upper end face of the lower L-shaped clamping block and the upper surface of the variable-section elastic beam of the fixed cantilever beam sensor are coplanar. The lower end face of the upper L-shaped clamping block and the lower surface of the variable-section elastic beam of the movable cantilever beam sensor are coplanar. The distance l between the upper surface of the fixed cantilever beam sensor and the lower surface of the movable cantilever beam sensor is called a loading beam space. The lower clamping blade block and the upper clamping blade block are rigid cylinders with the same shape and size, and their axes are parallel with the axes of the fixed cantilever beam sensor and the movable cantilever beam sensor. The first indicative line and the second indicative line are engraved in the front side face and the back side face of the variable-section elastic beam of the fixed cantilever beam sensor in the vertical direction, the first indicative line is located in the middle surface of the lower L-shaped clamping block of the lower jaw, and the second indicative line is located in the middle surface of the lower clamping blade block. The third indicative line and the fourth indicative line are engraved in the front side face and the back side face of the variable-section elastic beam of the movable cantilever beam sensor in the vertical direction. The third indicative line is located in the middle surface of the upper L-shaped clamping block of the upper jaw and is colinear with the first indicative line, and the fourth indicative line is located in the middle surface of the upper clamping blade block and is colinear with the second indicative line. The resistance strain gauges $R_1$, $R_2$, $R_3$, and $R_4$ form a full-bridge measuring circuit, and is called a displacement-deformation sensing circuit, and a strain signal generated by the circuit is $\varepsilon_{rd}$. The resistance strain gauges $R_3$, $R_4$, $R_5$, and $R_6$ form a full-bridge measuring circuit, and is called a force sensing circuit, and a strain signal generated by the circuit is $\varepsilon_{rf}$. The tristate encoder comprises a toothed disc, a sensor support, a left upper cantilever beam sensor, a right upper cantilever beam sensor, a left lower cantilever beam sensor, and a right lower cantilever beam sensor. The toothed disc has a plurality of arc-shaped teeth, is located below the guard disc, and is coaxially fixed to the second unthreaded shaft of the drive lead screw. The number of the teeth is the integer times of 4. The sensor support is a rectangular frame, and an unthreaded hole vertical to the frame plane is respectively machined in the middle portions of four sides of the frame; a rectangular through hole and a threaded hole vertically communicated with the rectangular through hole are respectively machined in positions close to each side corner, and the axis of the rectangular through hole is parallel with the frame plane and vertical to the located side. The sensor support is fixed to the lower surface of the top plate of the base through the matching of fastening bolts and spacing sleeves with the unthreaded holes and the threaded holes, and the sensor support surrounds the toothed disc. The left upper cantilever beam sensor, the right upper cantilever beam sensor, the left lower cantilever beam sensor, and the right lower cantilever beam sensor adopt uniform-section elastic beams or variable-section elastic beams, and the four elastic beams are respectively fixed to the upper side inner wall, the right side inner wall, the left side inner wall, and the lower side inner wall of the sensor support through the matching of the roots of the four elastic beams with the rectangular through holes under the compression action of fastening screws. The uniaxial resistance strain gauges $[R_7, R_8]$, $[R_9, R_{10}]$, $[R_{11}, R_{12}]$ and $[R_{13}, R_{14}]$ are adhered to the upper surface and lower surface or the left surface and the right surface of the four elastic beams close to the roots of the four elastic beams in the axial directions of the elastic beams, respectively; a left triangular ridge, an upper triangular ridge, a lower triangular ridge, and a right triangular ridge are respectively machined on one side of the four elastic beams close to the free end towards the toothed disc. The elastic beams of the mounted left upper cantilever beam sensor, the right upper cantilever beam sensor, the left lower cantilever beam sensor, and the right lower cantilever beam sensor have a certain pre-deformation. The elastic pressure generated by the pre-deformation makes the vertexes of the left triangular ridge, the upper triangular ridge, the lower triangular ridge, and the right triangular ridge come into contact with the arc teeth on the circumference of the toothed disc. The specific positions of four contact points are determined by the following conditions:

a. it is assumed that the longitudinal symmetric line of the toothed disc just passes through the centers of the highest arc tooth and the lowest arc tooth, and the horizontal symmetric line of the toothed disc just passes through the centers of the leftmost arc tooth and the rightmost arc tooth;

b. at this time, the right triangular ridge is located above the horizontal symmetric line of the toothed disc and the rightmost arc tooth and is just aligned to the valley bottom between the two adjacent arc teeth. The left triangular ridge is located on the horizontal symmetric line of the toothed disc and is just in contact with the vertex of the leftmost arc tooth. The upper triangular ridge and the lower triangular ridge are located on the right side of the longitudinal symmetric line of toothed disc, and are respectively in contact with the right side of the highest arc tooth and the right side of the lowest arc tooth; $h_{min}$ represents the distance from the right triangular ridge to the longitudinal symmetric line of the toothed disc; $h_{max}$ represents the distance from the left triangular ridge to the longitudinal symmetric line of the toothed disc; $h_{mid}$ represents the distance from the contact point of the upper triangular ridge and the highest arc tooth to the horizontal symmetric line of the toothed disc as well as the distance from the contact point of the lower triangular ridge and the lowest arc tooth to the horizontal symmetric line of the toothed disc; $h_{mid}$, $h_{min}$, and $h_{max}$ have the relationship shown in formula (1):

$$h_{mid} = \frac{h_{min} + h_{max}}{2} \quad (1)$$

$h_{min}$, $h_{mid}$, and $h_{max}$ are collectively called the feature height, wherein $h_{min}$ is called the minimum feature height, $h_{mid}$ is called the average feature height, $h_{max}$ is called the maximum feature height. The drive device is a motor-driven worm gear-worm mechanism or gear-toothed belt mechanism. The drive device drives the drive lead screw to rotate forwards and reversely by matching with the second unthreaded shaft of the drive lead screw. The encoding lead screw works in the following manners:

(1), connecting a measurement circuit of the tristate encoder: respectively connecting the resistance strain gauges [$R_7$, $R_8$], [$R_9$, $R_{10}$], [$R_{11}$, $R_{12}$], and [$R_{13}$, $R_{14}$] to the numerical control unit in a half bridge manner; respectively utilizing $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ to represent strain readings of the four half bridge measurement circuits measured by the numerical control unit;

(2), initially adjusting the measurement circuits of the tristate encoder: utilizing the numerical control unit to control the drive lead screw and the toothed disc to rotate, wherein the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13}, R_{14})}$ accordingly have continuous periodic variation, T represents the variation period and also represents a tooth top space between the two adjacent arc teeth of the toothed disc, and when the toothed disc rotates by every tooth, namely a period T, the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13}, R_{14})}$ respectively finish once cycle; observing the variation of $\varepsilon_{r(R_7,R_8)}$; $\varepsilon_{r(R_7,R_8)}$ when just reaches the minimum value $\varepsilon_{r\ min}$, stopping the rotation of the toothed disc, and adjusting balanced circuits of located bridges of the resistance strain gauges [$R_7$, $R_8$] of the numerical control unit to be balanced, that is $\varepsilon_{r(R_7,R_8)}=0$; repeating the above operations, and when $\varepsilon_{r(R_9,R_{10})}$, $\varepsilon_{r(R_{11},R_{12})}$, and $\varepsilon_{r(R_{13},R_{14})}$ reach the minimum value $\varepsilon_{r\ min}$, sequentially adjusting the balanced circuits of the located bridges of the resistance strain gauges [$R_9$, $R_{10}$], [$R_{11}$, $R_{12}$], and [$R_{13}$, $R_{14}$] to achieve $\varepsilon_{r(R_9,R_{10})}=0$, $\varepsilon_{r(R_{11},R_{12})}=0$, and $\varepsilon_{r(R_{13},R_{14})}=0$; after the four half bridge measurement circuits are adjusted by the above methods, driving the toothed disc to rotate again, so, $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ circularly varies between the minimum value 0 and the maximum value $\varepsilon_{rmax}$, wherein the minimum value 0 corresponds to a situation that the triangular ridge is just located at the valley bottom between the two adjacent arc teeth, that is, the minimum value 0 corresponds to the minimum feature height $h_{min}$. The maximum value $\varepsilon_{r\ max}$ corresponds to a situation that the triangular ridge is just in contact with the vortex of the arc tooth, that is, the maximum value corresponds to the maximum feature height $h_{max}$. The above method for adjusting the state of the measurement circuits of the tristate encoder is called an initial four-step adjusting method;

(3), determining the relationship of the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ and the rotation state of the toothed disc: after the initial adjustment of the measurement circuits of the tristate encoder is completed, specifying the numbers 1, 0 and ½ to respectively represent the maximum value $\varepsilon_{r\ max}$ the minimum value 0, and the average value $\varepsilon_{r\ mid}=0.5\varepsilon_{r\ max}$ of the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$, wherein the number 1 corresponds to the maximum feature height $h_{max}$ and is defined to be a full value. The number 0 corresponds to the minimum feature height $h_{min}$ and is defined to be a zero value. The number ½ corresponds to the average feature height $h_{mid}$ and is defined to be a mid-value. The full value 1, the zero value 0, and the mid-value ½ are collectively called the tristate coded values of the tristate encoder, and are called tristate values in short; when the toothed disc rotates, the tristate values 0, ½ and 1 circularly vary based on the period T. The circular variation of the tristate values 0, ½ and 1 is used for determining the rotation state of the toothed disc, including the rotation direction and the rotation angle. The tristate values 0, ½ and 1 totally have four different combinations, as shown in Table 1:

TABLE 1 tristate value combinations of strain readings $\varepsilon_{r(R_7, R_8)}$, $\varepsilon_{r(R_9, R_{10})}$, $\varepsilon_{r(R_{11}, R_{12})}$, and $\varepsilon_{r(R_{13}, R_{14})}$

|  | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| Tristate value combination 1 | 1 | 0 | ½ | ½ |
| Tristate value combination 2 | 0 | 1 | ½ | ½ |
| Tristate value combination 3 | ½ | ½ | 1 | 0 |
| Tristate value combination 4 | ½ | ½ | 0 | 1 |

TABLE 2 variation of tristate values 0, ½, and 1 in every period T in a clockwise rotation process of the toothed disc

|  | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| (1). 0-0.25 T | ↓ 1→½ | ↑ 0→½ | ↑ ½→1 | ↓ ½→0 |
| (2). 0.25 T-0.5 T | ↓ ½→0 | ↑ ½→1 | ↓ 1→½ | ↑ 0→½ |
| (3). 0.5 T-0.75 T | ↑ 0→½ | ↓ 1→½ | ↓ ½→0 | ↑ ½→1 |
| (4). 0.75 T-T | ↑ ½→1 | ↓ ½→0 | ↑ 0→½ | ↓ 1→½ |

In Table 2, "↑" represents increase of the tristate value, and "↓" represents decrease of the tristate value.

TABLE 3 variation of tristate values 0, ½, and 1 in every period T in an anticlockwise rotation process of the toothed disc

|  | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| (5). 0-0.25 T | ↓ 1→½ | ↑ 0→½ | ↓ ½→0 | ↑ ½→1 |
| (6). 0.25 T-0.5 T | ↓ ½→0 | ↑ ½→1 | ↑ 0→½ | ↓ 1→½ |
| (7). 0.5 T-0.75 T | ↑ 0→½ | ↓ 1→½ | ↑ ½→1 | ↓ ½→0 |
| (8). 0.75 T-T | ↑ ½→1 | ↓ ½→0 | ↓ 1→½ | ↑ 0→½ |

In Table 3, "↑" represents increase of the tristate value, and "↓" represents decrease of the tristate value.

Any tristate combination is selected from Table 1 to be taken as the starting point of the rotation state of the toothed disc 29. For clearly, the tristate combination 1 is selected from Table 1. So, when the toothed disc rotates over one tooth clockwise, the tristate values complete the circulation of one period T as shown in Table 2; when the toothed disc rotates over one tooth anticlockwise, the tristate values complete the circulation of one period T as shown in Table 3. In Table 2 and Table 3, the period T is divided into four ¼ sub periods. In every ¼ sub period, the tristate values of the four strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ respectively generate different increase and decrease variations. Eight rows of data from (1) to (8) are different in pairs and have the uniqueness, wherein each row of data uniquely represents a specific rotation state of the toothed disc. For example, a row of data in (3) represents and only represents that the toothed disc rotates by the third ¼ sub period of the period T clockwise, namely 0.5 T-0.75 T; a row of data in (5) represents and only represents that the toothed disc rotates by the first ¼ period of the period T anticlockwise, namely 0-0.25 T. The continuously varied strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ respectively match with the tristate values 0, ½, and 1 and are used for monitoring the rotation state of the toothed disc.

(4), determining the displacement amount of the movable cantilever beam sensor: adjusting the movable cantilever beam sensor to a certain appointed position or any position of the drive lead screw, recording such position to be the displacement original point of the movable cantilever beam sensor, and meanwhile, recording the current position of the toothed disc to be the toothed disc zero position; rotating the toothed disc from the toothed disc zero position such that the movable cantilever beam sensor accordingly moves from the displacement original point along the drive lead screw upwards or downwards; wherein the displacement amount S of the movable cantilever beam sensor corresponding to the displacement original point is calculated by formula (2):

$$S = t\frac{n_{z,s} - n_{z,n}}{N_c} = t\frac{n_z}{N_c} \quad (2)$$

In formula (2), t represents the lead of the drive lead screw, $N_c$ represents the number of teeth of the toothed disc, $n_{z,s}$ represents the number of total rotating teeth of the toothed disc during clockwise rotation from the toothed disc zero position, $n_{z,n}$ represents the number of total rotating teeth of the toothed disc during anticlockwise rotation from the toothed disc zero position, $n_{z,s}$ and $n_{z,n}$ constantly are positive values, and $n_z$ represents the difference between $n_{z,s}$ and $n_{z,n}$ and is defined to be the number of efficient rotating teeth of the toothed disc; $n_{z,s}$, $n_{z,n}$, and $n_z$ are also called rotation parameters of the toothed disc; $n_z$ and S are algebraic values; when the toothed disc rotates clockwise, the movable cantilever beam sensor moves downwards, and the symbols of $n_z$ and S are "−"; when the toothed disc rotates anticlockwise, the movable cantilever beam sensor moves upwards, and the symbols of $n_z$ and S are "+".

The cross-section measuring and locating support comprises two supports with V-shaped slots, two press plates and four locking bolts. The two supports are vertically mounted at the upper portion of the top plate of the base, are respectively located on two sides of the fixed cantilever beam sensor, and are also symmetric about the middle surface of the fixed cantilever beam sensor. The openings of the two V-shaped slots of the supports face upwards and are located at the coaxial positions. The longitudinal symmetry plane of the V-shaped slot is superposed with the central sections of the lower clamping blade block and the upper clamping blade block. Two through holes are machined in each press plate, and the four locking bolts respectively pass through the four through holes to match with the threaded holes on the two sides of the V-shaped slots in the tops of the supports.

The standard is a set of standard gauges, and n represents the number of the standard gauges, 2≤n≤10. The structure of the standard gauge is a three-section step shaft. The middle section of the step shaft is a standard cylinder, and the left section and the right section thereof are locating shafts. The diameter of the standard cylinder is called the standard diameter, sequentially represented by $d_1, d_2, \ldots,$ and $d_n$ and is arranged in an order of $d_1 < d_2, \ldots, < d_n$ The diameters d of the left and right section locating shafts of each standard gauge are equal to each other; any standard cylinder is selected as the reference cylinder, its diameter is defined to be the reference diameter represented by $d_0$. The arithmetic average of $d_1, d_2, \ldots, d_n$ is represented by d; $d_1, d_2, \ldots, d_n$ also represent the corresponding standard gauge; any standard gauge is put into the V-shaped slot of the support, the four locking bolts are screwed down, then the two press plates generate the pressure to locate the standard gauge in the V-shaped slot. The distance between the axis of the mounted standard gauge and the upper surface of the top plate of the base is defined to be the height of the standard gauge, and the symbol $h_0$ represents the height. The structure and the size of $h_0$ are mutually coordinated with the structures and the sizes of the standard gauge, the support and the fixed cantilever beam sensor to meet the specific relationship: 1, when any standard gauge is located in the V-shaped slot of the support, the strain value $\varepsilon_{rd}$ measured by the displacement-deformation sensing circuit is in the range of $100\mu\varepsilon \le \varepsilon_{rd} \le 150\mu\varepsilon$; 2, when the standard gauge $d_n$ is located in the V-shaped slot of the support, the maximum bending normal stress of an elastomer of the fixed cantilever beam sensor does not exceed the proportion limit of the material of the elastomer.

The test piece is a tensile/compression specimen of metal filament, high molecular material, fabric fiber, animal fiber and other fiber materials.

The numerical control unit is a microcomputer control system with a strain signal acquisition-adjustment circuit. The measurement software is installed in the system. The measurement software comprises a force calibration-measurement program, a deformation calibration-measurement program, and a diameter calibration-measurement program;

The testing process of the double cantilever beam-encoding lead screw combined sensing tensile test method and machine comprises test machine system calibration, test piece size measurement and tensile test, wherein the operating steps are as follows:

(1), displacement reference point adjustment of the test machine: respectively connecting the displacement-deformation sensing circuit formed by the resistance strain gauges $R_1$, $R_2$, $R_3$, and $R_4$ and the four half bridge measurement circuits formed by the resistance strain gauges [$R_7$, $R_8$], [$R_9$, $R_{10}$], [$R_{11}$, $R_{12}$], and [$R_{13}$, $R_{14}$] to the numerical control unit; adjusting the displacement-deformation sensing circuit to be an equilibrium state, that is, setting its output signal $\varepsilon_{rd}=0$; adjusting the tristate encoder by the initial four-step adjusting method; using the numerical control unit to control the movable cantilever beam sensor to approach to the fixed cantilever beam sensor, wherein, when the upper clamping blade block and the lower clamping blade block come into contact, and the strain value $\varepsilon_{rd}$ measured by the displacement-deformation sensing circuit is equal to the specified value $\varepsilon_{rd_c}$, the movable cantilever beam sensor stops moving, and the specified value $\varepsilon_{rd_c}$ is valued in the range of 0~10με, for example, $\varepsilon_{rd_c}=5\mu\varepsilon$; recording the current position of the toothed disc to be the toothed disc zero position, and meanwhile, defining the position of the movable cantilever beam sensor to be the displacement zero point $P_0$, wherein $P_0$ is the reference point for displacement measurement of the test machine, wherein, when the movable cantilever beam sensor is located at the position $P_0$, the loading beam space l reaches the minimum value and is recoded to be $l_{min}$, and the value of $l_{min}$ is shown in formula (3):

$$l_{min} = 2u \tag{3}$$

In formula (3), u represents the height of the upper clamping blade block protruded out of the lower surface of the movable cantilever beam sensor, and also represents the height of the lower clamping blade block protruded out of the upper surface of the fixed cantilever beam sensor.

(2), calibration of a force measurement system: connecting the force sensing circuit formed by the resistance strain gauges $R_3$, $R_4$, $R_5$, and $R_6$ to the numerical control unit; adjusting the movable cantilever beam sensor to a proper height, utilizing the upper jaw of the movable cantilever beam sensor to suspend a standard weight, applying a group of standard forces $F_1$, $F_2$, . . . , and $F_N$ to the movable cantilever beam sensor; or, utilizing a standard load sensor, utilizing the upper jaw of the movable cantilever beam sensor and the lower jaw of the fixed cantilever beam sensor to clamp the standard load sensor, and applying a group of standard forces $F_1$, $F_2$, . . . , and $F_N$ to the movable cantilever beam sensor, wherein the size relationship of the standard forces is $F_1 < F_2 <, \ldots, < F_N$, and the line of action of each standard force is simultaneously aligned to the first indicative line and the third indicative line; recording the strain readings $\varepsilon_{rf_1}$, $\varepsilon_{rf_2}$, . . . , and $\varepsilon_{rf_N}$ corresponding to the standard forces $F_1$, $F_2$, . . . , and $F_N$ by the numerical control unit; utilizing $\varepsilon_{rf_1}$, $\varepsilon_{rf_2}$, . . . , and $\varepsilon_{rf_N}$ to be calibration numbers, and using a linear fitting method to obtain the functional relationship of the force F and the strain reading $\varepsilon_{rf}$ of the numerical control unit, namely a load calculation formula:

$$F = \frac{\varepsilon_{rf} - B_1}{A_1} \tag{4}$$

In formula (4), $A_1$ and $B_1$ are constants and respectively calculated by formulae (5) and (6):

$$A_1 = \frac{N \sum_i^N F_i \varepsilon_{rf_i} - \sum_i^N F_i \sum_i^N \varepsilon_{rf_i}}{N \sum_i^N F_i^2 - \left(\sum_i^N F_i\right)^2} \tag{5}$$

$$B_1 = \frac{\sum_i^N \varepsilon_{rf_i} \sum_i^N F_i^2 - \sum_i^N F_i \sum_i^N F_i \varepsilon_{rf_i}}{N \sum_i^N F_i^2 - \left(\sum_i^N F_i\right)^2} \tag{6}$$

In formulae (5) and (6), N represents the ordinal of each standard force, $F_i$ represents the values of standard forces with the different ordinals, and $\varepsilon_{rf_i}$ represents the strain reading corresponding to the force $F_i$, namely the calibration numbers $\varepsilon_{rf_1}$, $\varepsilon_{rf_2}$, . . . , and $\varepsilon_{rf_N}$.

(3), calibration of a diameter measurement system: adjusting the movable cantilever beam sensor to a proper height, locating the standard gauge $d_1$ to the supports, and meanwhile, recording a strain signal measured by the displacement-deformation sensing circuit to be $0.5\varepsilon_{rd_1}$; moving the movable cantilever beam sensor downwards; when the upper clamping blade block comes into contact with the standard $d_1$, and the strain signal measured by the displacement-deformation sensing circuit is $\varepsilon_{rd} = 2 \times 0.5\varepsilon_{rd_1} = \varepsilon_{rf_1}$, stopping moving the movable cantilever beam sensor, defining its current position to be a diameter measurement indication position $P_d$, and meanwhile, recording the current position of the toothed disc, and defining such position to be a diameter measurement indication point of the toothed disc; lifting the movable cantilever beam sensor to a proper height, using the standard gauge $d_2$ to replace the standard gauge $d_1$, adjusting the movable cantilever beam sensor to the diameter measurement indication position $P_d$ again, and recording the current strain signal $\varepsilon_{rd_2}$ of the displacement-deformation sensing circuit; sequentially using the standard gauges $d_3$, . . . , and $d_n$ to repeatedly complete the above operations to obtain strain signals $\varepsilon_{rd_3}$, . . . , and $\varepsilon_{rd_n}$; utilizing $\varepsilon_{rd_1}$, $\varepsilon_{rd_2}$, . . . , and $\varepsilon_{rd_n}$ to be the calibration numbers, and using the linear fitting method to obtain the functional relationship of the diameter d and the strain reading $\varepsilon_{rd}$, namely, the diameter calculation formula:

$$d = \frac{\varepsilon_{rd} - B_2}{A_2} \tag{7}$$

In formula (7), $A_2$ and $B_2$ are constants and are respectively calculated by formulae (8) and (9):

$$A_2 = \frac{n \sum_i^n d_i \varepsilon_{rd_i} - \sum_i^n d_i \sum_i^n \varepsilon_{rd_i}}{n \sum_i^n d_i^2 - \left(\sum_i^N d_i\right)^2} \tag{8}$$

$$B_2 = \frac{\sum_i^n \varepsilon_{rd_i} \sum_i^n d_i^2 - \sum_i^n d_i \sum_i^n d_i \varepsilon_{rd_i}}{n \sum_i^n d_i^2 - \left(\sum_i^n d_i\right)^2} \tag{9}$$

In formulae (8) and (9), n represents the number of the standard gauges included in the standard; $d_i$ represents the diameters of standard cylinders with different diameters; $\varepsilon_{rd_i}$ represents the strain readings corresponding to the diameters $d_i$, namely the calibration numbers $\varepsilon_{rd_1}$, $\varepsilon_{rd_2}$, . . . , and $\varepsilon_{rd_n}$; in the calibration numbers $\varepsilon_{rd_1}$, $\varepsilon_{rd_2}$, . . . , and $\varepsilon_{rd_n}$, the calibration number corresponding to the reference cylinder $d_0$ is defined to be the reference strain indicator $\varepsilon_{rd_0}$.

(4), calibration of a deformation measurement system: adjusting the movable cantilever beam sensor to a proper height, horizontally putting the standard gauge $d_1$ between the upper jaw of the movable cantilever beam sensor and the lower jaw of the fixed cantilever beam sensor, and ensuring the axis of the standard gauge $d_1$ to be aligned to the first indicative line and the third indicative line; controlling the movable cantilever beam sensor to move towards the fixed cantilever beam sensor to clamp the standard gauge $d_1$; when the strain signal measured by the displacement-deformation sensing circuit is $\varepsilon_{rd} = \varepsilon_{rd_1}$ or $\varepsilon_{rd} \approx \varepsilon_{rd_1}$, stopping moving the movable cantilever beam sensor, and recording the current strain signal $\varepsilon_{rd}$ to be $\varepsilon^*_{rd_1}$; defining the position of the movable cantilever beam sensor to be the deformation measurement indication position $P_b$; recording the current position of the toothed disc, and defining the current position to be the deformation measurement indication point of the toothed disc; lifting up the movable cantilever beam sensor to a proper height, using the standard gauge $d_2$ to replace the standard gauge $d_1$, adjusting the movable cantilever beam sensor to the deformation measurement indication position $P_b$ again, and recording the current strain signal $\varepsilon^*_{rd_2}$ of the displacement-deformation sensing circuit; sequentially using the standard gauges $d_3, \ldots,$ and $d_n$ to repeatedly complete the above operations to obtain the corresponding strain signal $\varepsilon^*_{rd_3}, \ldots,$ and $\varepsilon^*_{rd_n}$ by the displacement-deformation sensing circuit; wherein, when the movable cantilever beam sensor and the fixed cantilever beam sensor clamp the standard gauge $d_n$, the space between the upper jaw of the movable cantilever beam sensor and the lower jaw of the fixed cantilever beam sensor varies corresponding to their natural space; defining the space between the upper jaw and the lower jaw at the first indicative line and the third indicative line to be a jaw deformation space $v_x$; utilizing $\varepsilon^*_{rd_1}, \varepsilon^*_{rd_2}, \ldots,$ and $\varepsilon^*_{rd_n}$ as the calibration numbers, and using the linear fitting method to obtain the functional relationship of $v_x$ and $\varepsilon_{rd}$, namely formula (10):

$$v_x = \frac{\varepsilon_{rd} - B_3}{A_3} \qquad (10)$$

In formula (10), $A_3$ and $B_3$ are constants and are respectively calculated by formulae (11) and (12):

$$A_2 = \frac{n\sum_i^n d_i \varepsilon^*_{rd_i} - \sum_i^n d_i \sum_i^n \varepsilon^*_{rd_i}}{n\sum_i^n d_i^2 - \left(\sum_i^N d_i\right)^2} \qquad (11)$$

$$B_2 = \frac{\sum_i^n \varepsilon^*_{rd_i} \sum_i^n d_i^2 - \sum_i^n d_i \sum_i^n d_i \varepsilon^*_{rd_i}}{n\sum_i^n d_i^2 - \left(\sum_i^n d_i\right)^2} \qquad (12)$$

In formulae (11) and (12), $d_i$ represents the diameters of the standard cylinders with different diameters, $\varepsilon^*_{rd_i}$ represents the strain reading corresponding to $d_i$, namely the calibration numbers $\varepsilon^*_{rd_1}, \varepsilon^*_{rd_2}, \ldots,$ and $\varepsilon^*_{rd_n}$.

(5), diameter measurement of the test piece: adjusting the movable cantilever beam sensor to a proper height, horizontally putting the test piece between the fixed cantilever beam sensor and the movable cantilever beam sensor, and ensuring the axis of the test piece to be aligned to the second indicative line and the fourth indicative line; controlling the movable cantilever beam sensor to move towards the fixed cantilever beam sensor such that the upper clamping blade block and the lower clamping blade block clamp the test piece; when the strain signal measured by the displacement-deformation sensing circuit is $\varepsilon_{rd} = \varepsilon_{rd_0}$ of $\varepsilon_{rd} \approx \varepsilon_{rd_0}$, or recording the displacement amount s of the movable cantilever beam sensor corresponding to the diameter measurement indication position $P_d$; using formula to calculate the diameter of the test piece:

$$d = \frac{\varepsilon_{rd} - B_2}{A_2} + s \qquad (13)$$

In formula (13), s is an algebraic value; when the movable cantilever beam sensor moves towards the upper portion of the diameter measurement indication position, the symbol of s is "+"; when the movable cantilever beam sensor moves towards the lower portion of the diameter measurement indication position, the symbol of s is "−".

(6), tensile test:

a. mounting the test piece: adjusting the loading beam space l according to the length of the test piece, putting the test piece between the upper jaw of the movable cantilever beam sensor and the lower jaw of the fixed cantilever beam sensor, ensuring the axis of the test piece to be aligned to the first indicative line and the third indicative line, and screwing down the locking screws and to ensure that the upper jaw and the lower jaw simultaneously tightly clamp the test piece, wherein a section of the mounted test piece located between the upper jaw and the lower jaw is called a test section, the length of the test section is equal to the loading beam space, and is l;

b. determining the original length of the test piece: adjusting the movable cantilever beam sensor to slightly lift up or down by the numerical control unit to ensure that the load of the test piece is zero, that is, the test force F=0; when F=0, defining the length of the test section of the test piece to be the original length $l_0$; calculating $l_0$ by formula (14);

$$l_0 = l_{min} + S_0 = 2u + S_0 \qquad (14)$$

in formula (14), when $S_0$ represents $F=_0$, the displacement amount $S_0$ of the movable cantilever beam sensor corresponding to the displacement zero point $P_0$ is calculated by formula (2); when the test piece is under the action of a tensile load, the length l of the test section continuously varies, and the variable l is calculated by formula (15):

$$l = S + v_b = S + \frac{\varepsilon_{rd} - B_3}{A_3} \qquad (15)$$

in formula (15), S is the displacement amount of the movable cantilever beam sensor corresponding to the displacement zero point $P_0$, and is calculated by formula (2);

c. testing the load: setting the loading speed by the numerical control unit, namely, the movement speed of the movable cantilever beam sensor; applying the tensile load to the test piece; using the numerical control unit to synchronously track and record the variation of the load F of the test piece and the length l of the test section, obtaining the force F of the test piece in real time based on formula (4), and obtaining the length l of the test section of the test piece based on formula; using real time data of F and l to draw an F–l relation curve, namely a tensile test curve of the test piece.

The present invention has the following advantages:

1. The double cantilever beam sensor and the encoding lead screw form the test system. In the present invention, the core portion of the main frame of the test machine is the force-deformation combined sensing mechanism formed by the double cantilever beam sensor and the encoding lead screw. The force and deformation measurement commonly utilize the resistance strain gauges as sensitive elements. Such mechanism simultaneously has the functions of clamping a test piece, loading, measuring the load, measuring the displacement and measuring the deformation. Furthermore, the mechanism can also measure the original section area of the test piece. Using the integrated and combined sensing structure design, the test machine has a simple and compact structure, is easy to maintain, and is helpful to improve the reliability of the whole system.

The present invention uses the encoding lead screw to adjust the space of the double cantilever beam sensor to measure the diameter. The measurement upper limit is decided by the movement distance of the movable cantilever beam sensor. The theoretical lower limit is 0; so, the upper clamping blade block and the lower clamping blade block can be adjusted to be in contact with each other. Therefore, if the present invention is applied to size measurement, a measurement range from 0 to hundreds of millimeters can be obtained. If the displacement resolution of the double cantilever beam sensor and the encoding lead screw is properly matched, the size measurement resolution of the present invention can be not more than 0.2 micrometer.

2. The loading has the flexibility. Compared with the test machine generally utilizing rigid cross beams to load the test piece, the test machine of the present invention utilizes the double cantilever beams to load the test piece. The fixed cantilever beam (namely the lower loading beam) and the movable cantilever beam (namely the upper loading beam) are elastic elements and may generate a certain bending deformation in the loading process; so, it is a flexible loading manner. Because the cantilever beam loading has the flexibility, the cantilever beam sensor can sense the instant variation of the load and the deformation in real time in the test process when the movement speed of the movable cantilever beam suddenly varies, so as to buffer the whole loading system.

3. The measurement has the flexibility. The present invention is used for measuring the diameter of the test piece. When the upper clamping blade block and the lower clamping blade block of the double cantilever beam sensor are in contact with the test piece, the numerical control unit enters an effective display state. In the efficient display state, the position of the movable cantilever beam sensor is adjusted to ensure that the strain reading $\varepsilon_{rd}$ varies close to the reference strain indicator $\varepsilon_{rd_0}$. So, it can be seen: even through $\varepsilon_{rd}$ and the displacement amount s of the movable cantilever beam sensor relative to the diameter measurement indication position $P_d$ vary, the diameter d given by formula (13) is changeless. This phenomenon is called the flexible equal difference output, which is an important property of the double cantilever beam sensor-encoding lead screw combined mechanism.

The deformation measurement of the present invention also has the flexible equal difference output property. Specifically, in the loading test process of the test piece, the bending deformation of the fixed cantilever beam sensor and the movable cantilever beam sensor is always coordinated with the displacement of the movable cantilever beam sensor; so, the strain reading $\varepsilon_{rd}$, the displacement amount s of the movable cantilever beam sensor and the test piece test section length l meet the relationship of formula (15) anytime. The flexible equal difference output property of the deformation measurement in combination with the above loading flexibility can create an experimental condition, which cannot be provided by the rigid loading test machine, for analyzing the material performance test and knowing the mechanical behavior of the material.

4. The standard calibrating method ensures the deformation measurement precision. The double cantilever beam-encoding lead screw combined sensing structure and its flexibility help the whole deformation test system to use the standard to calibrate. So, the deformation test can fully utilize the precision provided by the cantilever beam sensing and the lead screw sensing. Based on formula (15), the length l of the test section of the test piece comprises the displacement S of the movable cantilever beam sensor and the jaw deformation space $v_x$. therefore, the test error of the length l of the test section of the test piece is commonly decided by the test errors of S and $v_x$, which represents that formula (15) provides the principle evidence for the error analysis and control of the system deformation test.

5. The simulative measurement and digital measurement are combined. The force-deformation combined sensing mechanism of the present invention is formed by two basic measurement units, namely, the double cantilever beam sensor and the encoding lead screw. The strain signal outputted by the tristate encoder as the main functional component of the encoding lead screw is the modulus. The strain signal is subjected to three-stage quantitative process of the numerical control unit to obtain the digital tristate coding values 0, ½, and 1. Therefore, the present invention has double properties of simulative measurement and digital measurement. In the measuring process, the numerical control unit determines the rotation direction and the rotation angle of the toothed disc according to two-aspect condition parameters in real time: (1), increase and decrease variation of the strain simulation signals outputted by the four half bridges of the tristate encoder, namely alternative progressive increase and decrease of the four strain output signals; (2), variation of the tristate values, which is the eight logic state combinations shown in Table 2 and Table 3. These two-aspect condition parameters have the determined one-to-one correspondence relation, and match with each other to ensure the correctness and the accuracy of the displacement measurement of the encoding lead screw.

6. The calibration method is simple. The calibration of the deformation measurement system of the present invention is a binary reference transfer process, including the length reference transfer of a lead screw pair and the length reference transfer of the double cantilever beam sensor. On the premise that the drive precision (which is ensured by the machining and verifying technique) of the lead screw pair meets the requirements, as long as a set of standards completes the system calibration in a local range of the whole movement distance of the movable cantilever beam sensor, the accuracy of the full-range measurement and the deformation measurement can be ensured. Therefore, the test machine of the present invention only needs to configure one specification of the standard, and can calibrate the system randomly on the using site.

BRIEF DESCRIPTION OF THE DRAWINGS

FIG. 1B is a partial cross-sectional view of the structure taken along line A-A in FIG. 1a.

FIG. 1c is a partial cross-sectional view of the structure taken along line B-B in FIG. 1a.

FIG. 1d is a partial cross-sectional view of the structure taken along line C-C in FIG. 1a.

FIG. 1e is a partial cross-sectional view of the structure taken along line D-D in FIG. 1a.

Figure 1A:
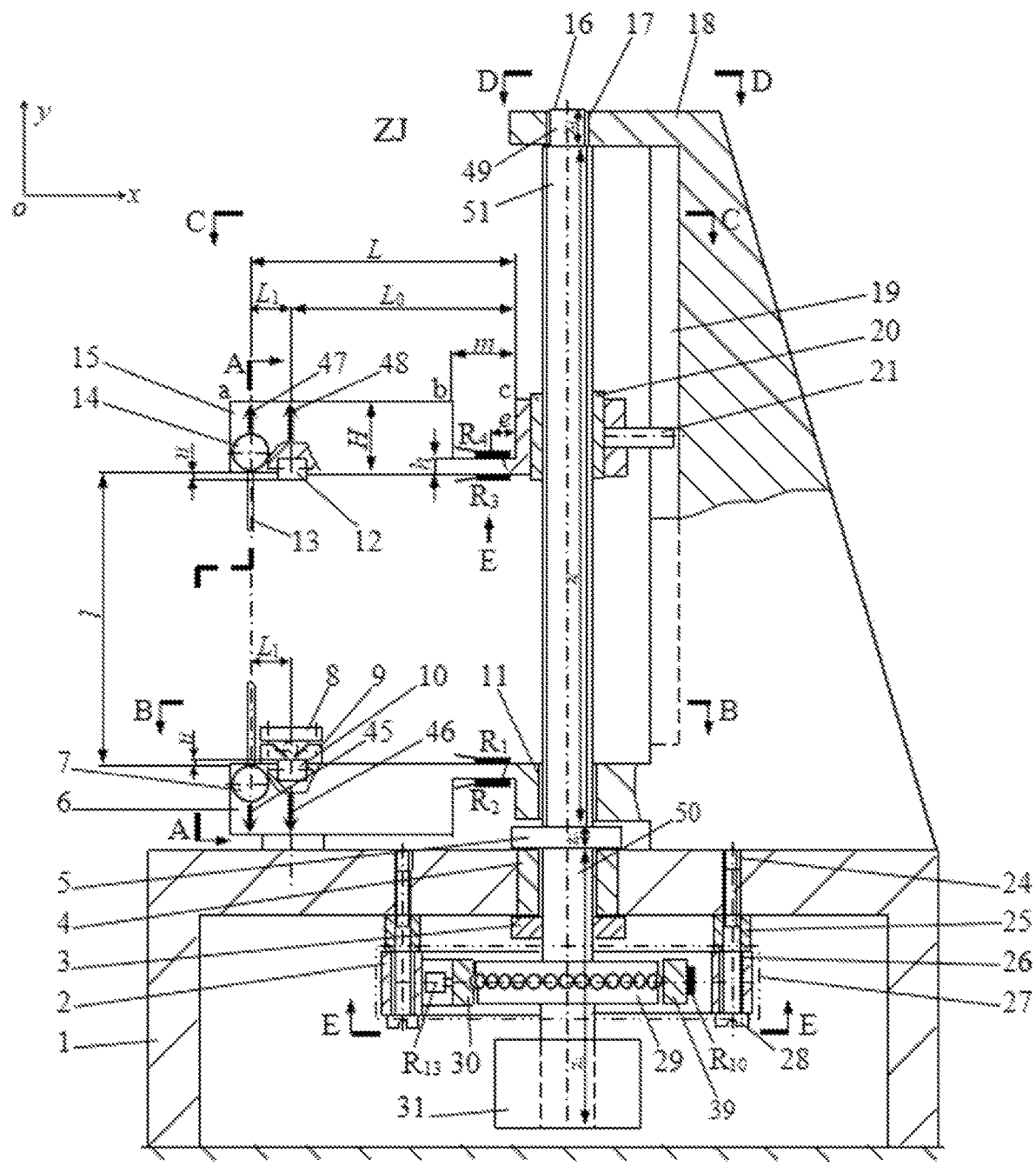
FIG. 1a is a front view showing the structure of a test machine.
Figure 1B:
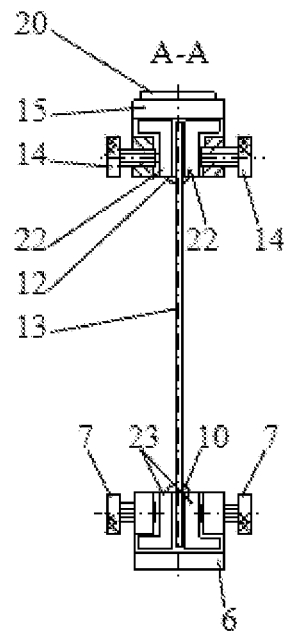
Figure 1C:
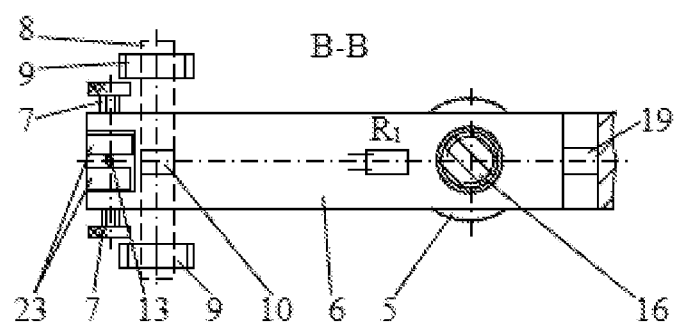
Figure 1D:
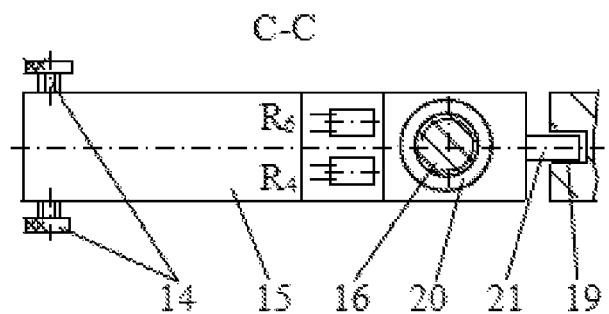
Figure 1E:
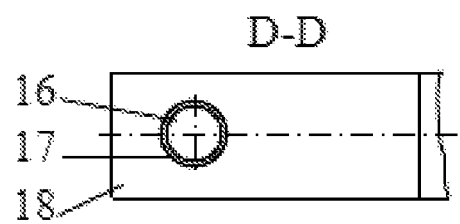
Figure 1F:
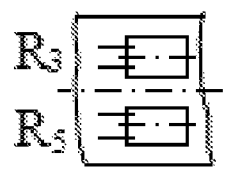

FIG. if is a partial view of the structure along the arrow E in FIG. 1a.

Figure 2:
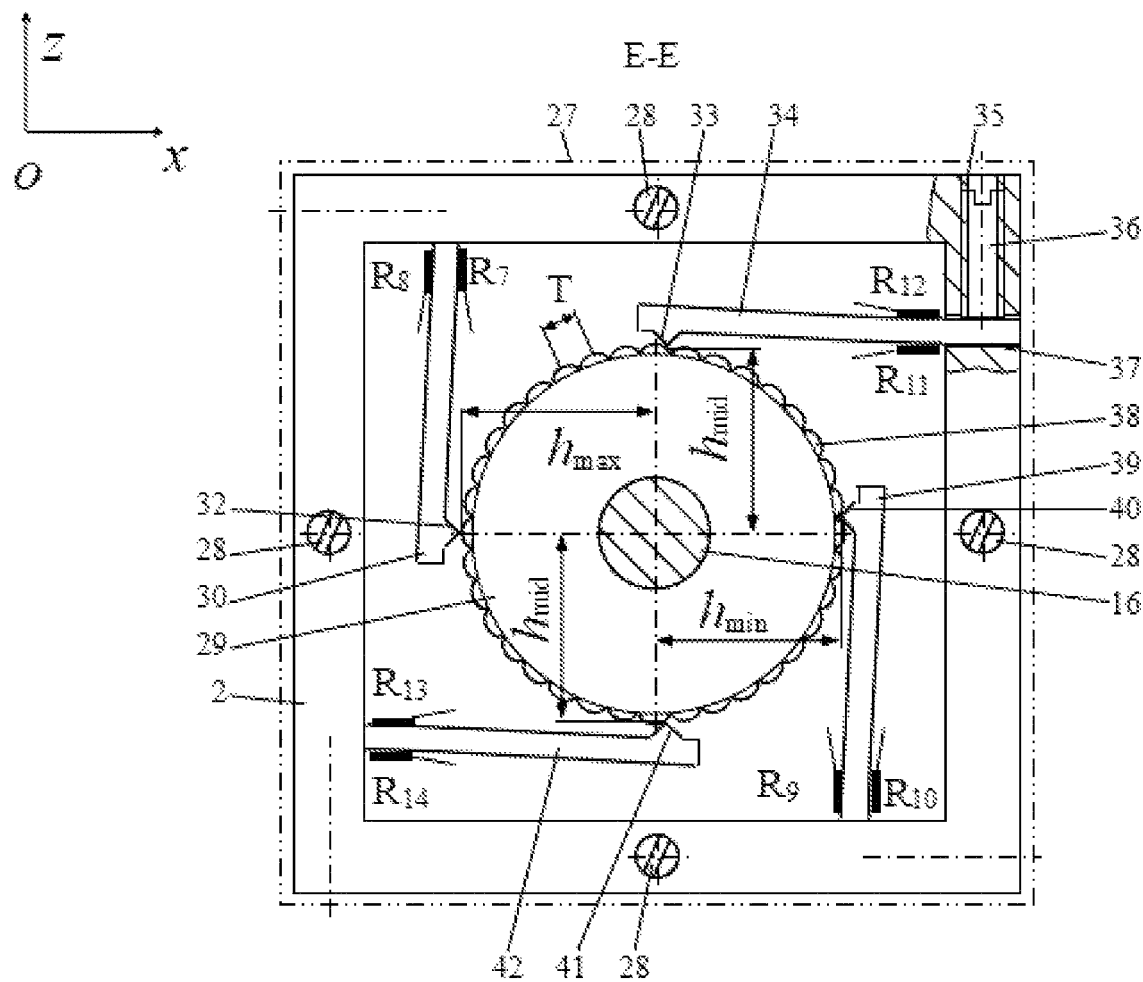

FIG. 2 is a schematic structural diagram of a tristate encoder, which is a partial cross section view of the structure taken along line E-E in FIG. 1a.

Figure 3:
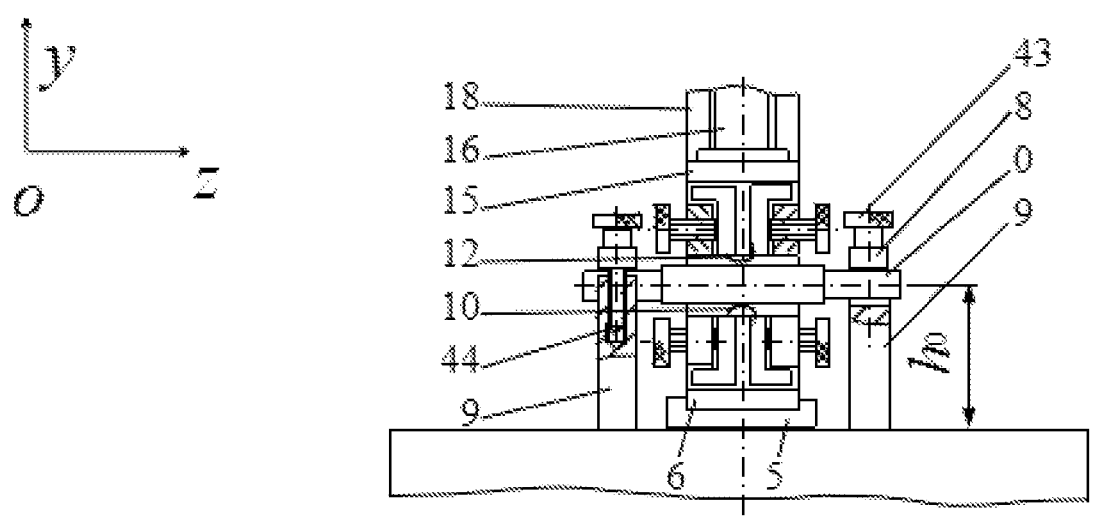

FIG. 3 is a structural diagram of a cross-section measuring and locating support.

Figure 4:
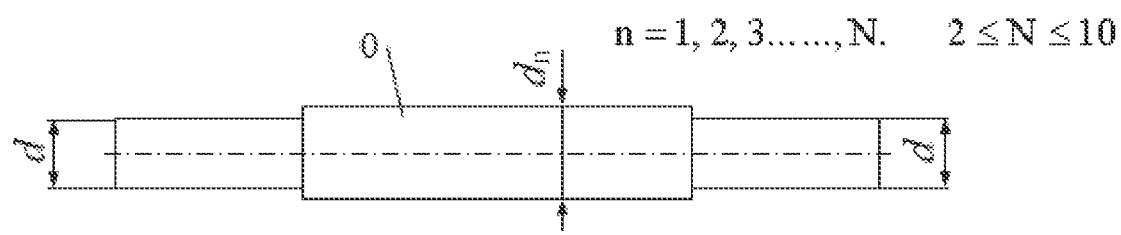

FIG. 4 is a structural diagram of a standard.

Figure 5:
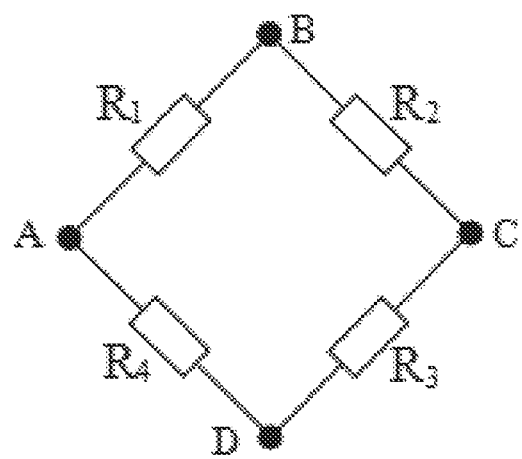

FIG. 5 is a schematic diagram showing a diameter measurement and deformation measurement bridge circuit of a double cantilever beam sensor.

Figure 6:
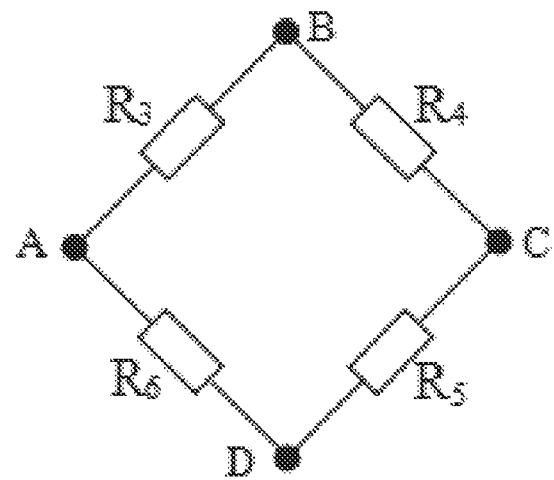

FIG. 6 is a schematic diagram showing a load measurement bridge circuit of a movable cantilever beam sensor.

Figure 7:
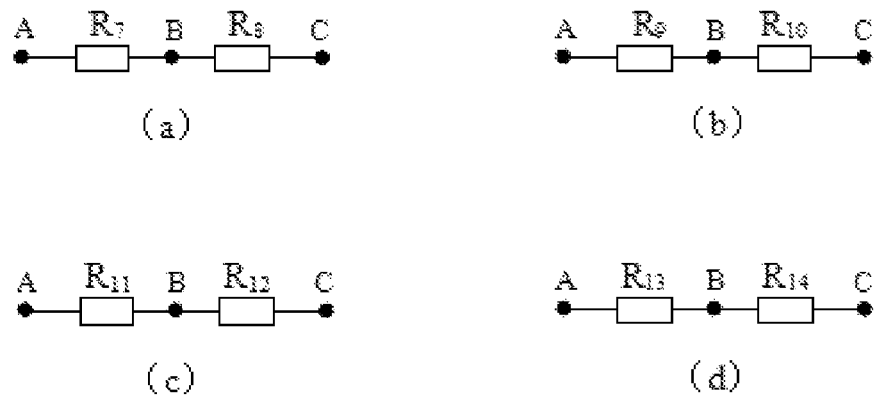

FIG. 7 is a set of schematic diagrams showing measurement circuits of a tristate encoder, wherein (a) is a diagram of a half bridge circuit formed by resistance strain gauges [R7, R8]; (b) is a diagram of a half bridge circuit formed by resistance strain gauges [R9, R10]; (c) is a diagram of a half bridge circuit formed by resistance strain gauges [R11, R12]; (d) is a diagram of a half bridge circuit formed by resistance strain gauges [R13, R14].

Figure 8:
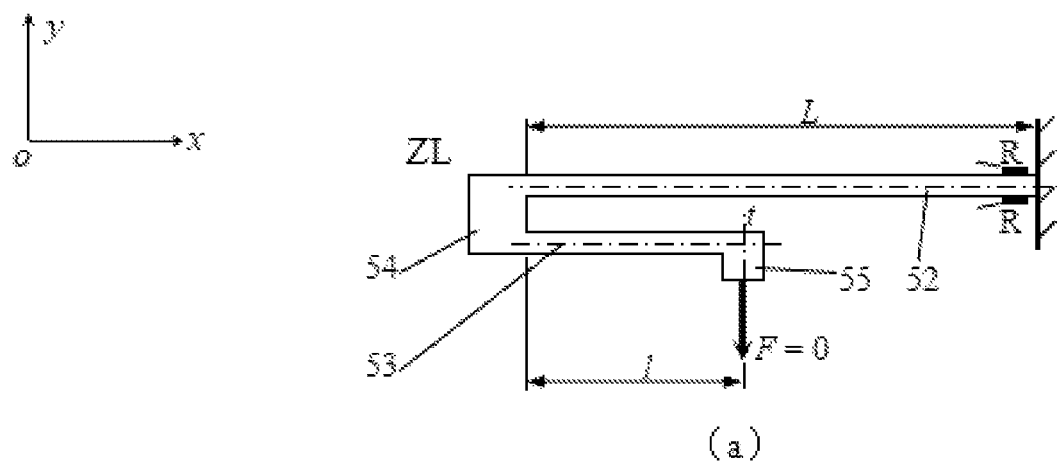
Figure 8:
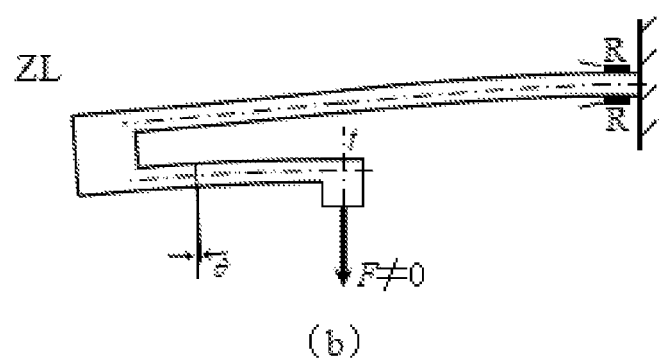

FIG. 8 is a schematic diagram of a cantilever beam sensor with a folded beam structure, wherein (a) shows a folded beam which does not generate bending deformation; (b) shows a folded beam which generates bending deformation.

In the drawings: 0—standard, 1—base, 2—sensor support, 3—guard disc, 4—sliding bearing, 5—step, 6—fixed cantilever beam sensor, 7—lower locking screw, 8—press plate, 9—support, 10—lower clamped blade block, 11—root round hole, 12—upper clamped blade block, 13—test piece, 14—upper locking screw, 15—movable cantilever beam sensor, 16—drive lead screw, 17—bearing hole, 18—support plate, 19—U-shaped guide slot, 20—drive nut, 21—cylindrical limit pin, 22—upper L-shaped clamping block, 23—lower L-shaped clamping block, 24—threaded hole, 25—spacing sleeve, 26—unthreaded hole, 27—tristate encoder, 28—fastening bolt, 29—toothed disc, 30—left upper cantilever beam sensor, 31—drive device, 32—left triangular ridge, 33—upper triangular ridge, 34—right upper cantilever beam sensor, 35—threaded hole, 36—fastening screw, 37—rectangular through hole, 38—arc tooth, 39—right lower cantilever beam sensor, 40—right triangular ridge, 41—lower triangular ridge, 42—left lower cantilever beam sensor, 43—locking bolt, 44—threaded hole, 45—first indicative line, 46—second indicative line, 47—third indicative line, 48—fourth indicative line, 49—first unthreaded shaft, 50—second unthreaded shaft, 51—threaded rod, 52—long straight beam, 53—short straight beam, 54—bending section, 55—test piece clamper, and ZJ—main frame.

DESCRIPTION OF THE EMBODIMENTS

The following describes the present invention with reference to the accompanying drawings. Referring to FIG. 1 to FIG. 7, the present invention proposes a double cantilever beam-encoding lead screw combined sensing tensile test method and machine. A test system comprises a main frame ZJ, a standard 0, a test piece 13 and a numerical control unit.

The main frame ZJ comprises a base 1, a support plate 18, a force-deformation combined sensing mechanism, a drive device 31 and a cross-section measuring and locating support.

The base 1 has a box-shaped structure, the upper surface of a top plate of the base is flat, a sliding bearing 4 is arranged at the center of the top plate, the axis of the sliding bearing is in the vertical direction, and four threaded holes 24 are symmetrically distributed around the sliding bearing 4. The support plate 18 is a trapezoid thick plate vertically fixed to the upper portion of the top plate of the base 1, and its right end is close to the right end of the base 1. The middle surface, namely, a longitudinal symmetry plane, of the support plate 18 is vertical to the right side face of the base 1 and passes through the axis of the sliding bearing 4. The top of the support plate 18 has a horizontal protruded platform extending to the left side, a bearing hole 17 is machined in the protruded platform, and the axis of the bearing hole 17 is superposed with the axis of the sliding bearing 4. A U-shaped guide slot 19 is machined in the left side of the support plate 18 in the vertical direction.

The force-deformation combined sensing mechanism comprises a force sensing mechanism and a deformation sensing mechanism. The force sensing mechanism comprises a drive lead screw 16 and a double cantilever beam sensor. The deformation sensing mechanism comprises an encoding lead screw and the double cantilever beam sensor. The encoding lead screw comprises the drive lead screw 16 and a tristate encoder 27.

The drive lead screw 16 is commonly used by the force sensing mechanism and the deformation sensing mechanism, and so the double cantilever beam sensor is. The structure of the drive lead screw 16 is divided into four sections, namely $z_1$, $z_2$, $z_3$, and $z_4$, from top to bottom. Section $z_1$ is the first unthreaded shaft 49, section $z_2$ is a threaded rod 51, section $z_3$ is a protruded step 5, and section $z_4$ is the second unthreaded shaft 50. The drive lead screw 16 is mounted on the base 1 through the matching of the first unthreaded shaft 49 and the bearing hole 17, the rotary sliding matching of the lower end face of the step 5 and the upper end face of the sliding bearing 4, the matching of the second unthreaded shaft 50 and the sliding bearing 4, the hole-axis interference fit of a guard disc 3 and the second unthreaded shaft 50, and the rotary sliding matching of the upper end face of the guard disc 3 and the lower end face of the sliding bearing 4.

The double cantilever beam sensor comprises a fixed cantilever beam sensor 6 and a movable cantilever beam sensor 15. The fixed cantilever beam sensor 6 comprises a variable-section elastic beam, an upward lower jaw mounted at the free end of the variable-section elastic beam, a lower clamping blade block 10 protruded upwards and embedded in the right side of the lower jaw, uniaxial resistance strain gauges $R_1$ and $R_2$ respectively adhered to the upper side surface and the lower side surface close to the root of the cantilever beam, and a root round hole 11. The movable cantilever beam sensor 15 comprises a variable-section elastic beam, a downward upper jaw mounted at the free end of the variable-section elastic beam, an upper clamping blade block 12 protruded downwards and embedded in the right side of the upper jaw, two uniaxial resistance strain gauges $R_3$ and $R_5$ adhered to the lower side surface close to the root of the cantilever beam, and two uniaxial resistance strain gauges $R_4$ and $R_6$ adhered to the upper side surface close to the root of the cantilever beam, a drive nut 20 with internal threads embedded in the root of the cantilever beam in an interference fit manner, and a cylindrical limit pin 21. The gate axes of the resistance strain gauges $R_1$, $R_2$, $R_3$, $R_4$, $R_5$, and $R_6$ are parallel with the axes of the located cantilever beams. The root of the fixed cantilever beam sensor 6 is fixedly connected with the left lower portion of the support plate 18; meanwhile, the drive lead screw 16 penetrates through the round hole 11 at the root of the fixed cantilever beam sensor 6, a certain space exists between the drive lead screw 16 and the round hole 11, and the drive lead screw and the round hole are not in contact. The movable cantilever beam sensor 15 is mounted on the drive lead screw 16 through the matching of the drive nut 20 and the threaded rod 51 and the sliding matching of the limit pin. 21 and the U-shaped guide slot 19 of the support plate 18. A matching pair of the drive nut 20 and the threaded rod 51 utilizes a clearance elimination measure. Theoretically, the matching space of the matching pair is zero, so, in the x-y plane, the right side of the movable cantilever beam sensor 15 can be taken as the fixed end utilizing the threaded rod 51 as the fixed support. The fixed cantilever beam sensor 6 and the movable cantilever beam sensor 15 are symmetrically arranged. The variable-section elastic beam of the fixed cantilever beam sensor 6 and the variable-section elastic beam of the movable cantilever beam sensor 15 have the same shape, size and material, the cross section of the beam is rectangular, the beam is divided into a rigid section ab and a flexible section bc from the free end a to the root c, the width of the rigid section ab and the width of the flexible section bc are the same, and the height H of the rigid section ab is larger than the height h of the flexible section bc. The lower jaw and the upper jaw have the same structure, their positions are symmetrical, the lower jaw is formed by two lower L-shaped clamping blocks 23 and two lower locking screws 7, and the upper jaw is formed by two upper L-shaped clamping blocks 22 and two upper locking screws 14. The upper end face of the lower L-shaped clamping block 23 and the upper surface of the variable-section elastic beam of the fixed cantilever beam sensor 6 are coplanar; the lower end face of the upper L-shaped clamping block 22 and the lower surface of the variable-section elastic beam of the movable cantilever beam sensor 15 are coplanar. The lower clamping blade block 10 and the upper clamping blade block 12 are rigid cylinders with the same shape and size, and their axes are parallel with the axes of the fixed cantilever beam sensor 6 and the movable cantilever beam sensor 15. The first indicative line 45 and the second indicative line 46 are engraved in the front side face and the back side face of the variable-section elastic beam of the fixed cantilever beam sensor 6 in the vertical direction, the first indicative line 45 is located in the middle surface of the lower L-shaped clamping block 23 of the lower jaw, and the second indicative line 46 is located in the middle surface of the lower clamping blade block 10. The third indicative line 47 and the fourth indicative line 48 are engraved in the front side face and the back side face of the variable-section elastic beam of the movable cantilever beam sensor 15 in the vertical direction; the third indicative line 47 is located in the middle surface of the upper L-shaped clamping block 22 of the upper jaw and is colinear with the first indicative line 45, and the fourth indicative line 48 is located in the middle surface of the upper clamping blade block 12 and is colinear with the second indicative line 46.

The fixed cantilever beam sensor 6 and the movable cantilever beam sensor 15 always have a certain flexible deformation in a testing process so as to cause the test piece clamper (namely the upper jaw and the lower jaw) to generate deflection, and the test piece deflects an ideal state of axial stress. To overcome such harmful situation, the elastomers of the two cantilever beam sensors may utilize the folded beam structure. FIG. 8 shows a hook-shaped folded beam, its structure can be divided into a long straight beam 52, a short straight beam 53, a bending section 54 and a test piece clamper 55. The right end of the long straight beam 52 is the fixed end, that is, the right side of the fixed cantilever beam sensor 6 (or the movable cantilever beam sensor 15) is the fixed end in the x-y plane in short. The section area of the bending section is large, the bending section 54 can be taken as a rigid joint. The test piece clamper 55 represents a tensile clamper, and also represents a compression clamper (pressure head). Assuming that the bending rigidities of the long straight beam 52 and the short straight beam 53 in the x-y plane are equal, the line of action of the test force F is superposed with the vertical symmetric line t of the test piece clamper 55; so, when the length L of the long straight beam 52 and the length l of the short straight beam 53 meet the condition L=(1+√2)l, the section corner of the folded beam at the line of action of the load F is θ=0. θ=0, representing that the test piece clamper 55 does not generate deflect in the x-y plane in the test process.

The resistance strain gauges $R_1$, $R_2$, $R_3$, and $R_4$ form a full-bridge measuring circuit, and is called a displacement-deformation sensing circuit, and a strain signal generated by the circuit is $\varepsilon_{rd}$; the resistance strain gauges $R_3$, $R_4$, $R_5$, and $R_6$ form a full-bridge measuring circuit, and is called a force sensing circuit, and a strain signal generated by the circuit is $\varepsilon_{rf}$.

The tristate encoder 27 comprises a toothed disc 29, a sensor support 2, a left upper cantilever beam sensor 30, a right upper cantilever beam sensor 34, a left lower cantilever beam sensor 42, and a right lower cantilever beam sensor 39. The toothed disc 29 has a plurality of arc-shaped teeth 38, is located below the guard disc 3, and is coaxially fixed to the second unthreaded shaft 50 of the drive lead screw 16. The number of the teeth is the integer times of 4, such as 128, 180, 360, and 1024. The sensor support 2 is a rectangular frame, and an unthreaded hole 26 vertical to the frame plane is respectively machined in the middle portions of four sides of the frame; a rectangular through hole 37 and a threaded hole 35 vertically communicated with the rectangular through hole 37 are respectively machined in positions close to each side corner, and the axis of the rectangular through hole is parallel with the frame plane and vertical to the located side. The sensor support 2 is fixed to the lower surface of the top plate of the base 1 through the matching of fastening bolts 28 and spacing sleeves 25 with the unthreaded holes 26 and the threaded holes 24, and the sensor support surrounds the toothed disc 29. The left upper cantilever beam sensor 30, the right upper cantilever beam sensor 34, the left lower cantilever beam sensor 42, and the right lower cantilever beam sensor 39 adopt uniform-section elastic beams or variable-section elastic beams, and the four elastic beams are respectively fixed to the upper side inner wall, the right side inner wall, the left side inner wall, and the lower side inner wall of the sensor support 2 through the matching of the roots of the four elastic beams with the rectangular through holes 37 under the compression action of fastening screws 36. The uniaxial resistance strain gauges $[R_7, R_8]$, $[R_9, R_{10}]$, $[R_{11}, R_{12}]$, and $[R_{13}, R_{14}]$ are adhered to the upper surface and lower surface or the left surface and the right surface of the four elastic beams close to the roots of the four elastic beams in the axial directions of the elastic beams, respectively. A left triangular ridge 32, an upper triangular ridge 33, a lower triangular ridge 41, and a right triangular ridge 40 are respectively machined on one side of the four elastic beams close to the free end towards the toothed disc 29. The elastic beams of the four mounted cantilever beam sensors have a certain bending deformation called pre-deformation; the elastic pressure generated by the pre-deformation makes the vertexes of the left triangular ridge 32, the upper triangular ridge 33, the lower triangular ridge 41, and the right triangular ridge 40 come into contact with the arc teeth 38 on the circumference of the toothed disc 29. The specific positions of four contact points are determined by the following conditions:

a. It is assumed that the longitudinal symmetric line of the toothed disc 29 just passes through the centers of the highest arc tooth 38 and the lowest arc tooth 38, and the horizontal symmetric line of the toothed disc 29 just passes through the centers of the leftmost arc tooth 38 and the rightmost arc tooth 38.

b. At this time, the right triangular ridge 40 is located above the horizontal symmetric line of the toothed disc 29 and the rightmost arc tooth 38 and is just aligned to the valley bottom between the two adjacent arc teeth 38. The left triangular ridge 32 is located on the horizontal symmetric line of the toothed disc 29 and is just in contact with the vertex of the leftmost arc tooth 38. The upper triangular ridge 33 and the lower triangular ridge 41 are located on the right side of the longitudinal symmetric line of toothed disc 29, and are respectively in contact with the right side of the highest arc tooth 38 and the right side of the lowest arc tooth 38. $h_{min}$ represents the distance from the right triangular ridge 40 to the longitudinal symmetric line of the toothed disc 29. $h_{max}$ represents the distance from the left triangular ridge 32 to the longitudinal symmetric line of the toothed disc 29. $h_{mid}$ represents the distance from the contact point of the upper triangular ridge 33 and the highest arc tooth 38 to the horizontal symmetric line of the toothed disc 29 as well as the distance from the contact point of the lower triangular ridge 41 and the lowest arc tooth 38 to the horizontal symmetric line of the toothed disc 29. $h_{mid}$, $h_{min}$, and $h_{max}$ have the relationship shown in formula (1):

$$h_{mid} = \frac{h_{min} + h_{max}}{2} \quad (1)$$

$h_{min}$, $h_{mid}$, and $h_{max}$ are collectively called the feature height, wherein $h_{min}$ is called the minimum feature height, $h_{mid}$ is called the average feature height, $h_{max}$ is called the maximum feature height.

The drive device 31 is a motor-driven worm gear-worm mechanism or gear-toothed belt mechanism; the drive device drives the drive lead screw 16 to rotate forwards and reversely by matching with the second unthreaded shaft 50 of the drive lead screw 16.

The encoding lead screw works in the following manners:

(1), connecting a measurement circuit of the tristate encoder 27: respectively connecting the resistance strain gauges [$R_7$, $R_8$], [$R_9$, $R_{10}$], [$R_{11}$, $R_{12}$], and [$R_{13}$, $R_{14}$] to the numerical control unit in a half bridge manner; respectively utilizing $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ to represent strain readings of the four half bridge measurement circuits measured by the numerical control unit;

(2), initially adjusting the measurement circuits of the tristate encoder 27: utilizing the numerical control unit to control the drive lead screw 16 and the toothed disc 29 to rotate, wherein the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ accordingly have continuous periodic variation, T represents the variation period and also represents a tooth top space between the two adjacent arc teeth 38 of the toothed disc 29, and when the toothed disc 29 rotates by every tooth, namely a period T, the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ respectively finish once cycle; observing the variation of $\varepsilon_{r(R_7,R_8)}$; when $\varepsilon_{r(R_7,R_8)}$ just reaches the minimum value $\varepsilon_{rmin}$ stopping the rotation of the toothed disc 29, and adjusting balanced circuits of located bridges of the resistance strain gauges [$R_7$, $R_8$] of the numerical control unit to be balanced, that is $\varepsilon_{r(R_7,R_8)}=0$; repeating the above operations, and when $\varepsilon_{r(R_9,R_{10})}$, $\varepsilon_{r(R_{11},R_{12})}$, and $\varepsilon_{r(R_{13},R_{14})}$ reach the minimum value $\varepsilon_{rmin}$, sequentially adjusting the balanced circuits of the located bridges of the resistance strain gauges [$R_9$, $R_{10}$], [$R_{11}$, $R_{12}$], and [$R_{13}$, $R_{14}$] to achieve $\varepsilon_{r(R_9,R_{10})}=0$, $\varepsilon_{r(R_{11},R_{12})}=0$, and $\varepsilon_{r(R_{13},R_{14})}=0$; after the four half bridge measurement circuits are adjusted by the above methods, driving the toothed disc 29 to rotate again, so, $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ circularly varies between the minimum value 0 and the maximum value $\varepsilon_{rmax}$, wherein the minimum value 0 corresponds to a situation that the triangular ridge 32/33/40/41 is just located at the valley bottom between the two adjacent arc teeth 38, that is, the minimum value 0 corresponds to the minimum feature height $h_{min}$; the maximum value $\varepsilon_{rmax}$ corresponds to a situation that the triangular ridge 32/33/40/41 is just in contact with the vortex of the arc tooth 38, that is, the maximum value corresponds to the maximum feature height $h_{max}$; the above method for adjusting the state of the measurement circuits of the tristate encoder 27 is called an initial four-step adjusting method;

(3), determining the relationship between the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ and the rotation state of the toothed disc 29: after the initial adjustment of the measurement circuits of the tristate encoder 27 is completed, specifying the numbers 1, 0 and ½ to respectively represent the maximum value $\varepsilon_{rmax}$, the minimum value 0, and the average value $\varepsilon_{rmid}=0.5\varepsilon_{rmax}$ of the strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$, wherein the number 1 corresponds to the maximum feature height $h_{max}$ and is defined to be a full value; the number 0 corresponds to the minimum feature height $h_{min}$ and is defined to be a zero value; the number ½ corresponds to the average feature height $h_{mid}$ and is defined to be a mid-value; the full value 1, the zero value 0, and the mid-value ½ are collectively called the tristate coded values of the tristate encoder, and are called tristate values in short; when the toothed disc 29 rotates, the tristate values 0, ½ and 1 circularly vary based on the period T; the circular variation of the tristate values 0, ½ and 1 is used for determining the rotation state of the toothed disc 29, including the rotation direction and the rotation angle. The tristate values 0, ½ and 1 totally have four different combinations, as shown in Table 1:

TABLE 1 tristate value combinations of strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$

| | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| Tristate value combination 1 | 1 | 0 | ½ | ½ |
| Tristate value combination 2 | 0 | 1 | ½ | ½ |
| Tristate value combination 3 | ½ | ½ | 1 | 0 |
| Tristate value combination 4 | ½ | ½ | 0 | 1 |

TABLE 2 variation of tristate values 0, ½, and 1 in every period T in a clockwise rotation process of the toothed disc 29

| | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| (1). 0-0.25 T | ↓ 1→½ | ↑ 0→½ | ↑ ½→1 | ↓ ½→0 |
| (2). 0.25 T-0.5 T | ↓ ½→0 | ↑ ½→1 | ↓ 1→½ | ↑ 0→½ |

TABLE 2-continued variation of tristate values 0, ½, and 1 in every
period T in a clockwise rotation process of the toothed disc 29

| | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| (3). 0.5 T-0.75 T | ↑ 0→½ | ↓ 1→½ | ↓ ½→0 | ↑ ½→1 |
| (4). 0.75 T-T | ↑ ½→1 | ↓ ½→0 | ↑ 0→½ | ↓ 1→½ |

In table 2, "↑" represents increase of the tristate value, and "↓" represents decrease of the tristate value.

TABLE 3 variation of tristate values 0, ½, and 1 in every period
T in an anticlockwise rotation process of the toothed disc 29

| | $\varepsilon_{r(R_7, R_8)}$ | $\varepsilon_{r(R_9, R_{10})}$ | $\varepsilon_{r(R_{11}, R_{12})}$ | $\varepsilon_{r(R_{13}, R_{14})}$ |
|---|---|---|---|---|
| (5). 0-0.25 T | ↓ 1→½ | ↑ 0→½ | ↓ ½→0 | ↑ ½→1 |
| (6). 0.25 T-0.5 T | ↓ ½→0 | ↑ ½→1 | ↑ 0→½ | ↓ 1→½ |
| (7). 0.5 T-0.75 T | ↑ 0→½ | ↓ 1→½ | ↑ ½→1 | ↓ ½→0 |
| (8). 0.75 T-T | ↑ ½→1 | ↓ ½→0 | ↓ 1→½ | ↑ 0→½ |

In Table 3, "↑" represents increase of the tristate value, and "↓" represents decrease of the Instate value.

Any tristate combination is selected from Table 1 to be taken as the starting point of the rotation state of the toothed disc 29. For clearly, the tristate combination 1 is selected from Table 1. So, when the toothed disc 29 rotates over one tooth clockwise, the tristate values complete the circulation of one period T as shown in Table 2; when the toothed disc 29 rotates over one tooth anticlockwise, the tristate values complete the circulation of one period T as shown in Table 3. In Table 2 and Table 3, the period T is divided into four ¼ sub periods. In every ¼ sub period, the tristate values of the four strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ respectively generate different increase and decrease variations. Eight rows of data from (1) to (8) are different in pairs and have the uniqueness, wherein each row of data uniquely represents a specific rotation state of the toothed disc 29. For example, a row of data in (3) represents and only represents that the toothed disc 29 rotates by the third ¼ sub period of the period T clockwise, namely 0.5 T-0.75 T; a row of data in (5) represents and only represents that the toothed disc 29 rotates by the first ¼ period of the period T anticlockwise, namely 0-0.25 T. The continuously varied strain readings $\varepsilon_{r(R_7,R_8)}$, $\varepsilon_{r(R_9,R_{10})}$, $\varepsilon_{r(R_{11},R_{12})}$, and $\varepsilon_{r(R_{13},R_{14})}$ respectively match with the tristate values 0, ½, and 1 and are used for monitoring the rotation state of the toothed disc 29.

(4), determining the displacement amount of the movable cantilever beam sensor 15: adjusting the movable cantilever beam sensor 15 to a certain appointed position or any position of the drive lead screw 16, recording such position to be the displacement original point of the movable cantilever beam sensor 15, and meanwhile, recording the current position of the toothed disc 29 to be the toothed disc zero position; rotating the toothed disc 29 from the toothed disc zero position such that the movable cantilever beam sensor 15 accordingly moves from the displacement original point along the drive lead screw 16 upwards or downwards; wherein the displacement amount S of the movable cantilever beam sensor 15 corresponding to the displacement original point is calculated by formula (2):

$$S = t\frac{n_{z,s} - n_{z,n}}{N_c} = t\frac{n_z}{N_c} \quad (2)$$

In formula (2), t represents the lead of the drive lead screw 16, $N_c$ represents the number of teeth of the toothed disc 29, $n_{z,s}$ represents the number of total rotating teeth of the toothed disc 29 during clockwise rotation from the toothed disc zero position, $n_{z,n}$ represents the number of total rotating teeth of the toothed disc 29 during anticlockwise rotation from the toothed disc zero position, $n_{z,s}$ and $n_{z,n}$ constantly are positive values, and $n_z$ represents the difference between $n_{z,s}$ and $n_{z,n}$ and is defined to be the number of efficient rotating teeth of the toothed disc 29. $n_{z,s}$, $n_{z,n}$, and $n_z$ are also called rotation parameters of the toothed disc. $n_z$ and S are algebraic values. When the toothed disc 29 rotates clockwise, the movable cantilever beam sensor 15 moves downwards, and the symbols of $n_z$ and S are "−". When the toothed disc 29 rotates anticlockwise, the movable cantilever beam sensor 15 moves upwards, and the symbols of $n_z$ and S are "+".

The cross-section measuring and locating support comprises two supports 9 with V-shaped slots, two press plates 8 and four locking bolts 43. The two supports 9 are vertically mounted at the upper portion of the top plate of the base 1, are respectively located on two sides of the fixed cantilever beam sensor 6, and are also symmetric about the middle surface of the fixed cantilever beam sensor 6. The openings of the two V-shaped slots of the supports 9 face upwards and are located at the coaxial positions. The longitudinal symmetry plane of the V-shaped slot is superposed with the central sections of the lower clamping blade block 10 and the upper clamping blade block 12. Two through holes are machined in each press plate 8, and the four locking bolts 43 respectively pass through the four through holes to match with the threaded holes 44 on the two sides of the V-shaped slots in the tops of the supports 9.

The standard 0 is a set of standard gauges, and n represents the number of the standard gauges, 2≤n≤10, generally n=6 or n=7. The structure of the standard gauge is a three-section step shaft; the middle section of the step shaft is a standard cylinder, and the left section and the right section thereof are locating unthreaded shafts. The diameter of the standard cylinder is called the standard diameter, sequentially represented by $d_1$, $d_2$, . . . , and $d_n$, and is arranged in an order of $d_1 < d_2 <$ . . . , $< d_n$. $d_1$, $d_2$, . . . , and $d_n$ also represent corresponding standard gauges. The diameters d of the left and right section unthreaded shafts of each standard gauge are equal to each other. Any standard cylinder is selected as the reference cylinder, and its diameter is defined to be the reference diameter $d_0$. The arithmetic average of $d_1$, $d_2$, . . . , $d_n$ is represented by $\bar{d}$. Any standard gauge is put into the V-shaped slot of the support 9, the four locking bolts 43 are screwed down, then the two press plates 8 generate the pressure to locate the standard gauge at the cross-section measuring and locating support. The distance between the axis of the mounted standard gauge and the upper surface of the top plate of the base 1 is defined to be the height of the standard gauge, and the symbol $h_0$ represents the height. When the cross-section measuring and locating support is designed, the structure and the size of $h_0$ should be mutually coordinated with the structures and the sizes of the standard gauge, the supports 9 and the fixed cantilever beam sensor 6 to meet the relationship: 1, when any standard gauge is located in the V-shaped slot of the support 9, the strain value $\varepsilon_{rd}$ measured by the displacement-deformation sensing circuit is in the range of 100με≤$\varepsilon_{rd}$≤150με; 2, when the standard gauge $d_n$ is located in the V-shaped slot of the support 9, the maximum bending normal stress of an elastomer of the fixed cantilever beam sensor 6 does not exceed the proportion limit of the material of the elastomer.

The test piece 13 is made from materials, including circular-section metal filaments or artificial fibers, plant fibers, animal fibers, optical fibers and the like, and it may also be a low-modulus tensile test piece made of plastic and rubber with the large section area.

The numerical control unit is a microcomputer control system with a strain signal acquisition-adjustment circuit. The measurement software is installed in the system. The measurement software comprises a force calibration-measurement program, a deformation calibration-measurement program, and a diameter calibration-measurement program. The algorithm of each program in the measurement software is designed according to Table 1, Table 2, Table 3, formula (1), formula (2), formula (3) to formula (15) and the following test methods.

The testing process of the double cantilever beam-encoding lead screw combined sensing tensile test method and machine comprises test machine system calibration, test piece size measurement and tensile test, wherein the operating steps are as follows:

(1), Displacement reference point adjustment of the test machine: respectively connecting the displacement-deformation sensing circuit formed by the resistance strain gauges $R_1$, $R_2$, $R_3$, and $R_4$ and the four half bridge measurement circuits formed by the resistance strain gauges $[R_7, R_8]$, $[R_9, R_{10}]$, $[R_{11}, R_{12}]$, and $[R_{13}, R_{14}]$ to the numerical control unit; adjusting the displacement-deformation sensing circuit to be an equilibrium state, that is, setting its output signal $\varepsilon_{rd}$=0; adjusting the tristate encoder 27 by the initial four-step adjusting method; using the numerical control unit to control the movable cantilever beam sensor 15 to approach to the fixed cantilever beam sensor 6, wherein, when the upper clamping blade block 12 and the lower clamping blade block 10 come into contact, and the strain value $\varepsilon_{rd}$ measured by the displacement-deformation sensing circuit is equal to the specified value $\varepsilon_{rd_G}$, the movable cantilever beam sensor 15 stops moving, and the specified value $\varepsilon_{rd_G}$ is a micro strain value and is generally valued in the range of 0~10με, for example, $\varepsilon_{rd_G}$=5με; recording the current position of the toothed disc 29 to be the toothed disc zero position, and meanwhile, defining the position of the movable cantilever beam sensor 15 to be the displacement zero point $P_0$, wherein $P_0$ is the reference point for displacement measurement of the test machine. When the movable cantilever beam sensor 15 is located at the position $P_0$, the loading beam space l reaches the minimum value and is recoded to be $l_{min}$, and the value of $l_{min}$ is shown in formula (3):

$$l_{min}=2u \tag{3}$$

In formula (3), u represents the height of the upper clamping blade block 12 protruded out of the lower surface of the movable cantilever beam sensor 15, and also represents the height of the lower clamping blade block 10 protruded out of the upper surface of the fixed cantilever beam sensor 6.

(2), Calibration of a force measurement system: connecting the force sensing circuit formed by the resistance strain gauges $R_3$, $R_4$, $R_5$, and $R_6$ to the numerical control unit; adjusting the movable cantilever beam sensor 15 to a proper height, utilizing the upper jaw of the movable cantilever beam sensor 15 to suspend a standard weight, applying a group of standard forces $F_1$, $F_2$, ..., and $F_N$ to the movable cantilever beam sensor 15; or, utilizing a standard load sensor, utilizing the upper jaw of the movable cantilever beam sensor 15 and the lower jaw of the fixed cantilever beam sensor 6 to clamp the standard load sensor, and applying a group of standard forces $F_1$, $F_2$, ..., and $F_N$ to the movable cantilever beam sensor 15, wherein the size relationship of the standard forces is $F_1<F_2<$, ..., $<F_N$, and the line of action of each standard force is simultaneously aligned to the first indicative line 45 and the third indicative line 47; recording the strain readings $\varepsilon_{rf_1}$, $\varepsilon_{rf_2}$, ..., and $\varepsilon_{rf_N}$ corresponding to the standard forces $F_1$, $F_2$, ..., and $F_N$ by the numerical control unit; utilizing $\varepsilon_{rf_1}$, $\varepsilon_{rf_2}$, ..., and $\varepsilon_{rf_N}$ to be calibration numbers, and using a linear fitting method to obtain the functional relationship of the force F and the strain reading $\varepsilon_{rf}$ of the numerical control unit, namely a load calculation formula:

$$F = \frac{\varepsilon_{rf} - B_1}{A_1} \tag{4}$$

In formula (4), $A_1$ and $B_1$ are constants and respectively calculated by formulae 5 and 6:

$$A_1 = \frac{N\sum_i^N F_i \varepsilon_{rf_i} - \sum_i^N F_i \sum_i^N \varepsilon_{rf_i}}{N\sum_i^N F_i^2 - \left(\sum_i^N F_i\right)^2} \tag{5}$$

$$B_1 = \frac{\sum_i^N \varepsilon_{rf_i} \sum_i^N F_i^2 - \sum_i^N F_i \sum_i^N F_i \varepsilon_{rf_i}}{N\sum_i^N F_i^2 - \left(\sum_i^N F_i\right)^2} \tag{6}$$

In formulae (5) and (6), N represents the ordinal of each standard force, $F_i$ represents the values of standard forces with the different ordinals, and $\varepsilon_{rf_i}$ represents the strain reading corresponding to the force $F_i$ namely the calibration numbers $\varepsilon_{rf_1}$, $\varepsilon_{rf_2}$, ..., and $\varepsilon_{rf_N}$.

(3), Calibration of a diameter measurement system: adjusting the movable cantilever beam sensor 15 to a proper height, locating the standard gauge $d_1$ to the supports 9, and meanwhile, recording a strain signal measured by the displacement-deformation sensing circuit to be $0.5\varepsilon_{rd_1}$; moving the movable cantilever beam sensor 15 downwards; when the upper clamping blade block 12 comes into contact with the standard $d_1$, and the strain signal measured by the displacement-deformation sensing circuit is $\varepsilon_{rd}=2\times 0.5\varepsilon_{rd_1}=\varepsilon_{rd_1}$, stopping moving the movable cantilever beam sensor 15, defining its current position to be a diameter measurement indication position $P_d$, meanwhile, recording the current position of the toothed disc 29, and defining such position to be a diameter measurement indication point of the toothed disc 29; lifting the movable cantilever beam sensor 15 to a proper height, using the standard gauge $d_2$ to replace the standard gauge $d_1$, adjusting the movable cantilever beam sensor 15 to the diameter measurement indication position $P_d$ again, and recording the current strain signal $\varepsilon_{rd_2}$ of the displacement-deformation sensing circuit; sequentially using the standard gauges $d_3$, ..., and $d_n$ to repeatedly complete the above operations to obtain strain signals $\varepsilon_{rd_3}$, ..., and $\varepsilon_{rd_n}$; utilizing $\varepsilon_{rd_1}$, $\varepsilon_{rd_2}$, ..., and $\varepsilon_{rd_n}$ to be the calibration numbers, and using the linear fitting method to obtain the functional relationship of the diameter d and the strain reading $\varepsilon_{rd}$, namely, the diameter calculation formula:

$$d = \frac{\varepsilon_{rd} - B_2}{A_2} \quad (7)$$

In formula (7), $A_2$ and $B_2$ are constants and are respectively calculated by formulae (8) and (9):

$$A_2 = \frac{n\sum_i^n d_i\varepsilon_{rd_i} - \sum_i^n d_i \sum_i^n \varepsilon_{rd_i}}{n\sum_i^n d_i^2 - \left(\sum_i^n d_i\right)^2} \quad (8)$$

$$B_2 = \frac{\sum_i^n \varepsilon_{rd_i} \sum_i^n d_i^2 - \sum_i^n d_i \sum_i^n d_i\varepsilon_{rd_i}}{n\sum_i^n d_i^2 - \left(\sum_i^n d_i\right)^2} \quad (9)$$

In formulae (8) and (9), n represents the number of the standard gauges included in the standard; $d_i$ represents the diameters of standard cylinders with different diameters; $\varepsilon_{rd_i}$ represents the strain readings corresponding to the diameters $d_i$, namely the calibration numbers $\varepsilon_{rd_1}$, $\varepsilon_{rd_2}$, ..., and $\varepsilon_{rd_n}$; in the calibration numbers $\varepsilon_{rd_1}$, $\varepsilon_{rd_2}$, ..., and $\varepsilon_{rd_n}$, the calibration number corresponding to the reference cylinder $d_0$ is defined to be the reference strain indicator $\varepsilon_{rd_0}$.

(4), Calibration of a deformation measurement system: adjusting the movable cantilever beam sensor 15 to a proper height, horizontally putting the standard gauge $d_1$ between the upper jaw of the movable cantilever beam sensor 15 and the lower jaw of the fixed cantilever beam sensor 6, and ensuring the axis of the standard gauge $d_1$ to be aligned to the first indicative line 45 and the third indicative line 47; controlling the movable cantilever beam sensor 15 to move towards the fixed cantilever beam sensor 6 to clamp the standard gauge $d_1$; when the strain signal measured by the displacement-deformation sensing circuit is $\varepsilon_{rd} = \varepsilon_{rd_1}$ or $\varepsilon_{rd} \approx \varepsilon_{rd_1}$, stopping moving the movable cantilever beam sensor 15, and recording the current strain signal $\varepsilon_{rd}$ to be $\varepsilon^*_{rd_1}$; defining the position of the movable cantilever beam sensor 15 to be the deformation measurement indication position $P_b$; recording the current position of the toothed disc 29, and defining the current position to be the deformation measurement indication point of the toothed disc 29; lifting up the movable cantilever beam sensor 15 to a proper height, using the standard gauge $d_2$ to replace the standard gauge $d_1$, adjusting the movable cantilever beam sensor 15 to the deformation measurement indication position $P_b$ again, and recording the current strain signal $\varepsilon^*_{rd_2}$ of the displacement-deformation sensing circuit; sequentially using the standard gauges $d_3$, ..., and $d_n$ to repeatedly complete the above operations to obtain the corresponding strain signal $\varepsilon^*_{rd_3}$, ..., and $\varepsilon^*_{rd_n}$ by the displacement-deformation sensing circuit; wherein, when the movable cantilever beam sensor 15 and the fixed cantilever beam sensor 6 clamp the standard gauge $d_n$, the space between the upper jaw of the movable cantilever beam sensor 15 and the lower jaw of the fixed cantilever beam sensor 6 varies corresponding to their natural space; defining the space between the upper jaw and the lower jaw at the first indicative line 45 and the third indicative line 47 to be a jaw deformation space $v_x$; utilizing $\varepsilon^*_{rd_1}$, $\varepsilon^*_{rd_2}$, ..., and $\varepsilon^*_{rd_n}$ as the calibration numbers, and using the linear fitting method to obtain the functional relationship of $v_x$ and $\varepsilon_{rd}$, namely formula (10):

$$v_x = \frac{\varepsilon_{rd} - B_3}{A_3} \quad (10)$$

In formula (10), $A_3$ and $B_3$ are constants and are respectively calculated by formulae (11) and (12):

$$A_3 = \frac{n\sum_i^n d_i\varepsilon^*_{rd_i} - \sum_i^n d_i \sum_i^n \varepsilon^*_{rd_i}}{n\sum_i^n d_i^2 - \left(\sum_i^n d_i\right)^2} \quad (11)$$

$$B_3 = \frac{\sum_i^n \varepsilon^*_{rd_i} \sum_i^n d_i^2 - \sum_i^n d_i \sum_i^n d_i\varepsilon^*_{rd_i}}{n\sum_i^n d_i^2 - \left(\sum_i^n d_i\right)^2} \quad (12)$$

In formulae (11) and (12), $d_i$ represents the diameters of the standard cylinders with different diameters, $\varepsilon^*_{rd_i}$ represents the strain reading corresponding to $d_i$, namely the calibration numbers $\varepsilon^*_{rd_1}$, $\varepsilon^*_{rd_2}$, ..., and $\varepsilon^*_{rd_n}$.

(5), Diameter measurement of the test piece: adjusting the movable cantilever beam sensor 15 to a proper height, horizontally putting the test piece 13 between the fixed cantilever beam sensor 6 and the movable cantilever beam sensor 15, and ensuring the axis of the test piece to be aligned to the second indicative line 46 and the fourth indicative line 48; controlling the movable cantilever beam sensor 15 to move towards the fixed cantilever beam sensor 6 such that the upper clamping blade block 12 and the lower clamping blade block 10 clamp the test piece 13; when the strain signal measured by the displacement-deformation sensing circuit is $\varepsilon_{rd} = \varepsilon_{rd_0}$ or $\varepsilon_{rd} \approx \varepsilon_{rd_0}$, recording the displacement amount s of the movable cantilever beam sensor 15 corresponding to the diameter measurement indication position $P_d$; using formula (13) to calculate the diameter of the test piece 13:

$$d = \frac{\varepsilon_{rd} - B_2}{A_2} + s \quad (13)$$

In formula (13), s is an algebraic value; when the movable cantilever beam sensor 15 moves towards the upper portion of the diameter measurement indication position, the symbol of s is "+"; when the movable cantilever beam sensor 15 moves towards the lower portion of the diameter measurement indication position, the symbol of s is "−".

(6), Tensile test:

a. mounting the test piece: adjusting the loading beam space l according to the length of the test piece 13, putting the test piece 13 between the upper jaw of the movable cantilever beam sensor 15 and the lower jaw of the fixed cantilever beam sensor 6, ensuring the axis of the test piece to be aligned to the first indicative line 45 and the third indicative line 47, and screwing down the locking screws 14 and 7 to ensure that the upper jaw and the lower jaw simultaneously tightly clamp the test piece 13, wherein a section of the mounted test piece 13 located between the upper jaw and the lower jaw is called a test section, the length of the test section is equal to the loading beam space, and is l;

b. determining the original length of the test piece: adjusting the movable cantilever beam sensor 15 to slightly lift up or down by the numerical control unit to ensure that the load of the test piece 13 is zero, that is, the test force F=0; when F=0, defining the length of the test section of the test piece 13 to be the original length $l_0$; calculating $l_0$ by formula (14);

$$l_0 = l_{min} + S_0 = 2u + S_0 \qquad (14)$$

in formula (14), when $S_0$ represents F=0, the displacement amount $S_0$ of the movable cantilever beam sensor 15 corresponding to the displacement zero point $P_0$ is calculated by formula (2); when the test piece 13 is under the action of a tensile load, the length l of the test section continuously varies, and the variable l is calculated by formula (15):

$$l = S + v_b = S + \frac{\varepsilon_{rd} - B_3}{A_3} \qquad (15)$$

in formula (15), S is the displacement amount of the movable cantilever beam sensor 15 corresponding to the displacement zero point $P_0$, and is calculated by formula (2);

c. testing the load: setting the loading speed by the numerical control unit, namely, the movement speed of the movable cantilever beam sensor 15; applying the tensile load to the test piece 13; using the numerical control unit to synchronously track and record the variation of the load F of the test piece 13 and the length l of the test section, obtaining the force F of the test piece 13 in real time based on formula (4), and obtaining the length l of the test section of the test piece 13 based on formula (15); using real time data of F and l to draw an F–l relation curve, namely a tensile test curve of the test piece 13.

What is claimed is:

1. A double cantilever beam-encoding lead screw combined sensing tensile test machine, wherein a test system comprises a main frame (ZJ), a standard (0), a test piece and a numerical control unit;

the main frame (ZJ) comprises a base, a support plate, a force-deformation combined sensing mechanism, a drive device and a cross-section measuring and locating support;

the base has a box-shaped structure, an upper surface of a top plate of the base is flat, a sliding bearing is arranged at a center of the top plate, an axis of the sliding bearing is in a vertical direction, and four threaded holes are symmetrically distributed around the sliding bearing;

the support plate is a trapezoid thick plate vertically fixed to an upper portion of the top plate of the base, and its right end is close to a right end of the base; a middle surface, namely, a longitudinal symmetry plane, of the support plate is vertical to a right side face of the base and passes through the axis of the sliding bearing;

a top of the support plate has a horizontal protruded platform extending to a left side, a bearing hole is machined in the protruded platform, and an axis of the bearing hole is superposed with the axis of the sliding bearing;

a U-shaped guide slot is machined in the left side of the support plate in the vertical direction;

the force-deformation combined sensing mechanism comprises a force sensing mechanism and a deformation sensing mechanism;

the force sensing mechanism comprises a drive lead screw and a double cantilever beam sensor;

the deformation sensing mechanism comprises an encoding lead screw and the double cantilever beam sensor; the encoding lead screw comprises the drive lead screw and a tristate encoder;

the drive lead screw is commonly used by the force sensing mechanism and the deformation sensing mechanism, and so the double cantilever beam sensor is; a structure of the drive lead screw is divided into four sections, namely $z_1$, $z_2$, $z_3$, and $z_4$, from top to bottom; section $z_1$ is a first unthreaded shaft, section $z_2$ is a threaded rod, section $z_3$ is a protruded step, and section $z_4$ is a second unthreaded shaft;

the drive lead screw is mounted on the base through a matching of the first unthreaded shaft and the bearing hole, a rotary sliding matching of a lower end face of the protruded step and an upper end face of the sliding bearing, a matching of the second unthreaded shaft and the sliding bearing, a hole-axis interference fit of a guard disc and the second unthreaded shaft, and the rotary sliding matching of the upper end face of the guard disc and a lower end face of the sliding bearing;

the double cantilever beam sensor comprises a fixed cantilever beam sensor and a movable cantilever beam sensor, the fixed cantilever beam sensor comprises a variable-section elastic beam, an upward lower jaw mounted at the free end of the variable-section elastic beam, a lower clamping blade block protruded upwards and embedded in a right side of the lower jaw, uniaxial resistance strain gauges $R_1$ and $R_2$ respectively adhered to the upper side surface and the lower side surface close to a root of the cantilever beam, and a root round hole;

the movable cantilever beam sensor comprises a variable-section elastic beam, a downward upper jaw mounted at the free end of the variable-section elastic beam, an upper clamping blade block protruded downwards and embedded in the right side of the upper jaw, two uniaxial resistance strain gauges $R_3$ and $R_5$ adhered to the lower side surface close to the root of the cantilever beam, and two uniaxial resistance strain gauges $R_4$ and $R_6$ adhered to the upper side surface close to the root of the cantilever beam, a drive nut with internal threads embedded in the root of the cantilever beam in an interference fit manner, and a cylindrical limit pin;

a gate axes of resistance strain gauges $R_1$, $R_2$, $R_3$, $R_4$, $R_5$, and $R_6$ are parallel with the axes of the located cantilever beams;

a root of the fixed cantilever beam sensor is fixedly connected with a left lower portion of the support plate;

meanwhile, the drive lead screw penetrates through a round hole at the root of the fixed cantilever beam sensor, a certain space exists between the drive lead screw and the round hole, and the drive lead screw and the round hole are not in contact;

the movable cantilever beam sensor is mounted on the drive lead screw through the matching of the drive nut and the threaded rod and the sliding matching of the limit pin and a U-shaped guide slot of the support plate;

the fixed cantilever beam sensor and the movable cantilever beam sensor are symmetrically arranged; the variable-section elastic beam of the fixed cantilever beam sensor and the variable-section elastic beam of the movable cantilever beam sensor have the same shape, size and material, a cross section of the beam is rectangular, the beam is divided into a rigid section ab and a flexible section bc from the free end a to a root c, a width of the rigid section ab and a width of the flexible section bc are the same, and a height H of the rigid section ab is larger than a height h of the flexible section bc;

a lower jaw and an upper jaw have the same structure, their positions are symmetrical, the lower jaw is formed by two lower L-shaped clamping blocks and two lower locking screws, and the upper jaw is formed by two upper L-shaped clamping blocks and two upper locking screws;

an upper end face of the lower L-shaped clamping block and an upper surface of the variable-section elastic beam of the fixed cantilever beam sensor are coplanar; a lower end face of the upper L-shaped clamping block and a lower surface of the variable-section elastic beam of the movable cantilever beam sensor are coplanar; a distance l between the upper surface of the fixed cantilever beam sensor and a lower surface of the movable cantilever beam sensor is called a loading beam space;

the lower clamping blade block and an upper clamping blade block are rigid cylinders with the same shape and size, and their axes are parallel with the axes of the fixed cantilever beam sensor and the movable cantilever beam sensor;

a first indicative line and a second indicative line are engraved in a front side face and a back side face of the variable-section elastic beam of the fixed cantilever beam sensor in a vertical direction, the first indicative line is located in a middle surface of the lower L-shaped clamping block of the lower jaw, and the second indicative line is located in the middle surface of the lower clamping blade block;

a third indicative line and a fourth indicative line are engraved in the front side face and the back side face of the variable-section elastic beam of the movable cantilever beam sensor in the vertical direction; the third indicative line is located in a middle surface of the upper L-shaped clamping block of the upper jaw and is colinear with the first indicative line, and the fourth indicative line s located in a middle surface of the upper clamping blade block and is colinear with the second indicative line;

the resistance strain gauges $R_1$, $R_2$, $R_3$, and $R_4$ form a full-bridge measuring circuit, and is called a displacement-deformation sensing circuit, and a strain signal generated by a circuit is $\varepsilon_{rd}$;

the resistance strain gauges $R_3$, $R_4$, $R_5$, and $R_6$ form a full-bridge measuring circuit, and is called a force sensing circuit, and a strain signal generated by the circuit is $\varepsilon_{rf}$;

a tristate encoder comprises a toothed disc, a sensor support, a left upper cantilever beam sensor, a right upper cantilever beam sensor, a left lower cantilever beam sensor, and a right lower cantilever beam sensor;

the toothed disc has a plurality of arc-shaped teeth, is located below the guard disc, and is coaxially fixed to the second unthreaded shaft of the drive lead screw;

a number of the arc-shaped teeth is an integer times of 4;

the sensor support is a rectangular frame, and an unthreaded hole vertical to the frame plane is respectively machined in middle portions of four sides of the frame;

a rectangular through hole and a threaded hole vertically communicated with the rectangular through hole are respectively machined in positions close to each side corner, and an axis of the rectangular through hole is parallel with the frame plane and vertical to a located side;

the sensor support is fixed to a lower surface of the top plate of the base through a matching of fastening bolts and spacing sleeves with the unthreaded holes and the threaded holes, and the sensor support surrounds the toothed disc;

the left upper cantilever beam sensor, the right upper cantilever beam sensor, the left lower cantilever beam sensor, and the right lower cantilever beam sensor adopt uniform-section elastic beams or variable-section elastic beams, and four elastic beams are respectively fixed to the upper side inner wall, the right side inner wall, the left side inner wall, and the lower side inner wall of the sensor support through the matching of the roots of the four elastic beams with the rectangular through holes under a compression action of fastening screws;

uniaxial resistance strain gauges [$R_7$, $R_8$], [$R_9$, $R_{10}$], [$R_{11}$, $R_{12}$], and [$R_{13}$, $R_{14}$] are adhered to an upper surface and a lower surface or a left surface and a right surface of the four elastic beams close to roots of the four elastic beams in axial directions of the elastic beams, respectively; a left triangular ridge, an upper triangular ridge, a lower triangular ridge, and a right triangular ridge are respectively machined on one side of the four elastic beams close to a free end towards the toothed disc;

the elastic beams of the mounted left upper cantilever beam sensor, the right upper cantilever beam sensor, the left lower cantilever beam sensor, and the right lower cantilever beam sensor have a certain pre-deformation; the elastic pressure generated by the pre-deformation makes vertexes of the left triangular ridge, the upper triangular ridge, the lower triangular ridge, and the right triangular ridge come into contact with the arc-shaped teeth on the circumference of the toothed disc;

specific positions of four contact points are determined by the following conditions:

a. it is assumed that a longitudinal symmetric line of the toothed disc just passes through centers of a highest arc-shaped tooth and a lowest arc-shaped tooth, and a horizontal symmetric line of the toothed disc just passes through the centers of a leftmost arc-shaped tooth and a rightmost arc-shaped tooth;

b. at this time, the right triangular ridge is located above the horizontal symmetric line of the toothed disc and the rightmost arc-shaped tooth and is aligned to a valley bottom between two adjacent arc-shaped teeth; the left triangular ridge is located on the horizontal symmetric line of the toothed disc and is just in contact with the vertex of the leftmost arc-shaped tooth; the upper triangular ridge and the lower triangular ridge are located on the right side of the longitudinal symmetric line of toothed disc, and are respectively in contact with the right side of the highest arc-shaped tooth and the right side of the lowest arc tooth; $h_{min}$ represents a distance from the right triangular ridge to the longitudinal symmetric line of the toothed disc; $h_{max}$ represents a distance from the left triangular ridge to the longitudinal symmetric line of the toothed disc; $h_{mid}$ represents a distance from the contact point of the upper triangular ridge and the highest arc-shaped tooth to the horizontal symmetric line of the toothed disc as well as a distance from the contact point of the lower triangular ridge and the lowest arc-shaped tooth to the horizontal symmetric line of the toothed disc; $h_{mid}$, $h_{min}$, and $h_{max}$ have the relationship shown in formula (1):

$$h_{mid} = \frac{h_{min} + h_{max}}{2} \quad (1)$$

$h_{min}$, $h_{mid}$, and $h_{max}$ are collectively called feature height, wherein $h_{min}$ is called a minimum feature height, $h_{mid}$ is called an average feature height, $h_{max}$ is called a maximum feature height; the drive device is a motor-driven worm gear-worm mechanism or gear-toothed belt mechanism;

the drive device drives the drive lead screw to rotate forwards and reversely by matching with the second unthreaded shaft of the drive lead screw; the encoding lead screw works in the following manners:

(1), connecting a measurement circuit of the tristate encoder: respectively connecting the resistance strain gauges $[R_7, R_8]$, $[R_9, R_{10}]$, $[R_{11}, R_{12}]$, and $[R_{13}, R_{14}]$ to the numerical control unit in a half bridge manner; respectively utilizing $\varepsilon_{r(R_7,R_8)}$, $\varepsilon_{r(R_9, R_{10})}$, $\varepsilon_{r(R_{11},R_{12})}$, and $\varepsilon_{r(R_{13},R_{14})}$ to represent strain readings of the four half bridge measurement circuits measured by the numerical control unit;

(2), initially adjusting the measurement circuits of the tristate encoder: utilizing the numerical control unit to control the drive lead screw and the toothed disc to rotate, wherein the strain readings $\varepsilon_{r(R_7,R_8)}$, $\varepsilon_{r(R_9, R_{10})}$, $\varepsilon_{r(R_{11},R_{12})}$, and $\varepsilon_{r(R_{13},R_{14})}$ accordingly have continuous periodic variation, T represents the variation period and also represents a tooth top space between the two adjacent arc teeth of the toothed disc, and when the toothed disc rotates by every tooth, namely a period T, the strain readings $\varepsilon_{r(R_7,R_8)}$, $\varepsilon_{r(R_9, R_{10})}$, $\varepsilon_{r(R_{11},R_{12})}$, and $\varepsilon_{r(R_{13},R_{14})}$ to respectively finish once cycle; observing the variation of $\varepsilon_{r(R_7,R_8)}$; when $\varepsilon_{r(R_7,R_8)}$ just reaches the minimum value $\varepsilon_{r\ min}$, stopping the rotation of the toothed disc, and adjusting balanced circuits of located bridges of the resistance strain gauges $[R_7, R_8]$ of the numerical control unit to be balanced, that is $\varepsilon_{r(R_7,R_8)}=0$; repeating the above operations, and when $\varepsilon_{r(R_9,R_{10})}$, $\varepsilon_{r(R_{11},R_{12})}$, and $\varepsilon_{r(R_{13},R_{14})}$ reach the minimum value $\varepsilon_{r\ min}$ sequentially adjusting the balanced circuits of the located bridges of the resistance strain gauges $[R_9, R_{10}]$, $[R_{11}, R_{12}]$, and $[R_{13}, R_{14}]$ to achieve $\varepsilon_{r(R_9,R_{10})}=0$, $\varepsilon_{r(R_{11},R_{12})}=0$, and $\varepsilon_{r(R_{13}, R_{14})}=0$; after the four half bridge measurement circuits are adjusted by the above methods, driving the toothed disc to rotate again, so, $\varepsilon_{r(R_7,R_8)}$, $\varepsilon_{r(R_9,\ R_{10})}$, $\varepsilon_{r(R_{11},R_{12})}$, and $\varepsilon_{r(R_{13},R_{14})}$ circularly varies between the minimum value 0 and the maximum value $\varepsilon_{r\ max}$ wherein the minimum value 0 corresponds to a situation that the triangular ridges is just located at the valley bottom between the two adjacent arc-shaped teeth, that is, the minimum value 0 corresponds to the minimum feature height $h_{min}$; the maximum value $\varepsilon_{r\ max}$ corresponds to a situation that the triangular ridges is just in contact with the vortex of the arc-shaped tooth, that is, the maximum value corresponds to the maximum feature height $h_{max}$; the above method for adjusting the state of the measurement circuits of the tristate encoder is called an initial four-step adjusting method;

(3), determining the relationship between the strain readings $\varepsilon_{r(R_7,R_8)}$, $\varepsilon_{r(R_9,\ R_{10})}$, $\varepsilon_{r(R_{11},R_{12})}$, and $\varepsilon_{r(R_{13},R_{14})}$ and a rotation state of the toothed disc: after an initial adjustment of the measurement circuits of the tristate encoder is completed, specifying the numbers 1, 0 and ½ to respectively represent the maximum value $\varepsilon_{r\ max}$, the minimum value 0, and the average value $\varepsilon_{mid}^{r}=0.5\varepsilon_{r\ max}$, of the strain readings $\varepsilon_{r(R_7,R_8)}$, $\varepsilon_{r(R_9,\ R_{10})}$, $\varepsilon_{r(R_{11},R_{12})}$, and $\varepsilon_{r(R_{13},R_{14})}$; wherein the number 1 corresponds to the maximum feature height $h_{max}$ and is defined to be a full value; the number 0 corresponds to the minimum feature height $h_{min}$ and is defined to be a zero value; the number ½ corresponds to the average feature height h.sub.mid and is defined to be a mid-value; the full value 1, the zero value 0, and the mid-value ½ are collectively called the tristate coded values of the tristate encoder, and are called tristate values in short; when the toothed disc rotates, the tristate values 0, ½ and 1 circularly vary based on the period T; the circular variation of the tristate values 0, ½ and 1 is used for determining the rotation state of the toothed disc, including the rotation direction and the rotation angle;

(4), determining a displacement amount of the movable cantilever beam sensor: adjusting the movable cantilever beam sensor to a certain appointed position or any position of the drive lead screw, recording such position to be a displacement original point of the movable cantilever beam sensor, and meanwhile, recording the current position of the toothed disc to be the toothed disc zero position; rotating the toothed disc from the toothed disc zero position such that the movable cantilever beam sensor accordingly moves from the displacement original point along the drive lead screw upwards or downwards; wherein the displacement amount S of the movable cantilever beam sensor corresponding to the displacement original point is calculated by formula (2):

$$S = t\frac{n_{z,s} - n_{z,n}}{N_c} = t\frac{n_z}{N_c} \quad (2)$$

in formula (2), t represents the lead of the drive lead screw, $N_c$ represents the number of teeth of the toothed disc, $n_{z,s}$ represents the number of total rotating teeth of the toothed disc during clockwise rotation from the toothed disc zero position, $n_{z,n}$ represents the number of total rotating teeth of the toothed disc during anticlockwise rotation from the toothed disc zero position, $n_{z,s}$ and $n_{z,n}$ constantly are positive values, and $n_z$ represents the difference between $n_{z,s}$ and $n_{z,n}$ and is defined to be the number of efficient rotating teeth of the toothed disc; $n_{z,s}$, $n_{z,n}$, and $n_z$ are also called rotation parameters of the toothed disc; $n_z$ and S are algebraic values; when the toothed disc rotates clockwise, the movable cantilever beam sensor moves downwards, and the symbols of $n_z$ and S are "−"; when the toothed disc rotates anticlockwise, the movable cantilever beam sensor moves upwards, and the symbols of $n_z$ and S are "+";

the cross-section measuring and locating support comprises two supports with V-shaped slots, two press plates and four locking bolts; the two supports are vertically mounted at the upper portion of the top plate of the base, are respectively located on two sides of the fixed cantilever beam sensor, and are also symmetric about the middle surface of the fixed cantilever beam sensor; openings of the two V-shaped slots of the supports face upwards and are located at the coaxial positions; a longitudinal symmetry plane of the V-shaped slot is superposed with the central sections of the lower clamping blade block and the upper clamping blade block; two through holes are machined in each press plate, and the four locking bolts respectively pass through the four through holes to match with the threaded holes on the two sides of the V-shaped slots in the tops of the supports;

the standard (0) is a set of standard gauges, and n represents the number of the standard gauges, $2 \leq n \leq 10$; a structure of the standard gauge is a three-section step shaft; a middle section of the step shaft is a standard cylinder, and a left section and a right section thereof are locating shafts; a diameter of the standard cylinder is called the standard diameter, sequentially represented by $d_1, d_2, \ldots,$ and $d_n$ and is arranged in an order of $d_1 < d_2, \ldots, < d_n$; the diameters d of the left and right section locating shafts of each standard gauge are equal to each other; any standard cylinder is selected as a reference cylinder, its diameter is defined to be a reference diameter represented by $d_0$; the arithmetic average of $d_1, d_2, \ldots, d_n$ is represented by d; $d_1, d_2, \ldots, d_n$ also represent the corresponding standard gauge; any standard gauge is put into the V-shaped slot of the support, the four locking bolts are screwed down, then the two press plates generate the pressure to locate the standard gauge in the V-shaped slot; a distance between an axis of the mounted standard gauge and the upper surface of the top plate of the base is defined to be the height of the standard gauge, and the symbol $h_0$ represents the height; the structure and the size of $h_0$ are mutually coordinated with the structures and the sizes of the standard gauge, the support and the fixed cantilever beam sensor to meet the specific relationship: 1, when any standard gauge is located in the V-shaped slot of the support, the strain value $\varepsilon_{rd}$ measured by the displacement-deformation sensing circuit is in the range of $100\mu\varepsilon \leq \varepsilon_{rd} \leq 150\mu\varepsilon$; 2, when the standard gauge $d_n$ is located in the V-shaped slot of the support, the maximum bending normal stress of an elastomer of the fixed cantilever beam sensor does not exceed the proportion limit of the material of the elastomer;

the test piece is a tensile/compression specimen of metal filament, high molecular material, fabric fiber, animal fiber and other fiber materials;

the numerical control unit is a microcomputer control system with a strain signal acquisition-adjustment circuit; a measurement software is installed in the system; the measurement software comprises a force calibration-measurement program, a deformation calibration-measurement program, and a diameter calibration-measurement program;

the testing process of the double cantilever beam-encoding lead screw combined sensing tensile test method and machine comprises test machine system calibration, test piece size measurement and tensile test, wherein the operating steps are as follows:

(1), displacement reference point adjustment of the test machine: respectively connecting the displacement-deformation sensing circuit formed by the resistance strain gauges $R_1, R_2, R_3,$ and $R_4$ and the four half bridge measurement circuits formed by the resistance strain gauges $[R_7, R_8], [R_9, R_{10}], [R_{11}, R_{12}],$ and $[R_{13}, R_{14}]$ to the numerical control unit; adjusting the displacement-deformation sensing circuit to be an equilibrium state, that is, setting its output signal $\varepsilon_{rd}=0$; adjusting the tristate encoder (27) by the initial four-step adjusting method; using the numerical control unit to control the movable cantilever beam sensor to approach to the fixed cantilever beam sensor, wherein, when the upper clamping blade block and the lower clamping blade block come into contact, and the strain value $\varepsilon_{rd}$ measured by the displacement-deformation sensing circuit is equal to the specified value $\varepsilon_{rd_G}$, the movable cantilever beam sensor (15) stops moving, and the specified value $\varepsilon_{rd_G}$ is valued in the range of $0 \sim 10\mu\varepsilon$, for example, $\varepsilon_{rd_G}=5\mu\varepsilon$; recording the current position of the toothed disc to be the toothed disc zero position, and meanwhile, defining the position of the movable cantilever beam sensor to be the displacement zero point $P_0$, wherein $P_0$ is the reference point for displacement measurement of the test machine, wherein, when the movable cantilever beam sensor is located at the position $P_0$, the loading beam space l reaches the minimum value and is recoded to be $l_{min}$, and the value of $l_{min}$ is shown in formula (3):

$$l_{min}=2u \qquad (3)$$

in formula (3), u represents the height of the upper clamping blade block protruded out of the lower surface of the movable cantilever beam sensor, and also represents the height of the lower clamping blade block protruded out of the upper surface of the fixed cantilever beam sensor;

(2), calibration of a force measurement system: connecting the force sensing circuit formed by the resistance strain gauges $R_3, R_4, R_5,$ and $R_6$ to the numerical control unit; adjusting the movable cantilever beam sensor to a proper height, utilizing the upper jaw of the movable cantilever beam sensor to suspend a standard weight, applying a group of standard forces $F_1, F_2, \ldots,$ and $F_N$ to the movable cantilever beam sensor; or, utilizing a standard load sensor, utilizing the upper jaw of the movable cantilever beam sensor and the lower jaw of the fixed cantilever beam sensor to clamp the standard load sensor, and applying a group of standard forces $F_1, F_2, \ldots,$ and $F_N$ to the movable cantilever beam sensor, wherein the size relationship of the standard forces is $F_1 < F_2 <, \ldots, < F_N$, and the line of action of each standard force is simultaneously aligned to the first indicative line and the third indicative line; recording the strain readings $\varepsilon_{rf_1}, \varepsilon_{rf_2}, \ldots,$ and $\varepsilon_{rf_N}$ corresponding to the standard forces $F_1, F_2, \ldots,$ and $F_N$ by the numerical control unit; utilizing readings $\varepsilon_{rf_1}, \varepsilon_{rf_2}, \ldots,$ and $\varepsilon_{rf_N}$ to be calibration numbers, and using a linear fitting method to obtain the functional relationship of the force F and the strain reading $\varepsilon_{rf}$ of the numerical control unit, namely a load calculation formula:

$$F = \frac{\varepsilon_{rf} - B_1}{A_1} \qquad (4)$$

in formula (4), $A_1$ and $B_1$ are constants and respectively calculated by formulae (5) and (6):

$$A_1 = \frac{N\sum_i^N F_i \varepsilon_{rf_i} - \sum_i^N F_i \sum_i^N \varepsilon_{rf_i}}{N\sum_i^N F_i^2 - \left(\sum_i^N F_i\right)^2} \quad (5)$$

$$B_1 = \frac{\sum_i^N \varepsilon_{rf_i} \sum_i^N F_i^2 - \sum_i^N F_i \sum_i^N F_i \varepsilon_{rf_i}}{N\sum_i^N F_i^2 - \left(\sum_i^N F_i\right)^2} \quad (6)$$

in formulae (5) and (6), N represents the ordinal of each standard force, $F_i$ represents the values of standard forces with the different ordinals, and $\varepsilon_{rf_i}$ represents the strain reading corresponding to the force $F_i$, namely the calibration numbers $\varepsilon_{rf_1}$, $\varepsilon_{rf_2}$, . . . , and $\varepsilon_{rf_N}$ (3), calibration of a diameter measurement system: adjusting the movable cantilever beam sensor to a proper height, locating the standard gauge d.sub.1 to the supports- and meanwhile, recording a strain signal measured by the displacement-deformation sensing circuit to be $0.5\varepsilon_{rd_1}$; moving the movable cantilever beam sensor downwards; when the upper clamping blade block comes into contact with the standard ($d_1$), and the strain signal measured by the displacement-deformation sensing circuit is $\varepsilon_{rd} = 2 \times 0.5\varepsilon_{rd_1} = \varepsilon_{rd_1}$, stopping moving the movable cantilever beam sensor, defining its current position to be a diameter measurement indication position $P_d$, and meanwhile, recording the current position of the toothed disc, and defining such position to be a diameter measurement indication point of the toothed disc; lifting the movable cantilever beam sensor to a proper height, using the standard gauge $d_2$ to replace the standard gauge $d_1$, adjusting the movable cantilever beam sensor to the diameter measurement indication position $P_d$ again, and recording the current strain signal $\varepsilon_{rd_2}$ of the displacement-deformation sensing circuit; sequentially using the standard gauges $d_3$, . . . , and $d_n$ to repeatedly complete the above operations to obtain strain signals $\varepsilon_{rd_3}$, . . . , and $\varepsilon_{rd_n}$; utilizing $\varepsilon_{rd_1}$, $\varepsilon_{rd_2}$, . . . , and $\varepsilon_{rd_n}$ to be the calibration numbers, and using the linear fitting method to obtain the functional relationship of the diameter d and the strain reading $\varepsilon_{rd}$, namely, the diameter calculation formula:

$$d = \frac{\varepsilon_{rd} - B_2}{A_2} \quad (7)$$

in formula (7), $A_2$ and $B_2$ are constants and are respectively calculated by formulae (8) and (9):

$$A_2 = \frac{n\sum_i^n d_i \varepsilon_{rd_i} - \sum_i^n d_i \sum_i^n \varepsilon_{rd_i}}{n\sum_i^n d_i^2 - \left(\sum_i^n d_i\right)^2} \quad (8)$$

$$B_2 = \frac{\sum_i^n \varepsilon_{rd_i} \sum_i^n d_i^2 - \sum_i^n d_i \sum_i^n d_i \varepsilon_{rd_i}}{n\sum_i^n d_i^2 - \left(\sum_i^n d_i\right)^2} \quad (9)$$

in formulae (8) and (9), n represents the number of the standard gauges included in the standard; $d_i$ represents the diameters of standard cylinders with different diameters; $\varepsilon_{rd_i}$ represents the strain readings corresponding to the diameters $d_i$, namely the calibration numbers $\varepsilon_{rd_1}$, $\varepsilon_{rd_2}$, . . . , and $\varepsilon_{rd_n}$; in the calibration numbers $\varepsilon_{rd_1}$, $\varepsilon_{rd_2}$, . . . , and $\varepsilon_{rd_n}$, the calibration number corresponding to the reference cylinder do is defined to be the reference strain indicator $\varepsilon_{rd_0}$;

(4), calibration of a deformation measurement system: adjusting the movable cantilever beam sensor to a proper height, horizontally putting the standard gauge $d_1$ between the upper jaw of the movable cantilever beam sensor and the lower jaw of the fixed cantilever beam sensor, and ensuring an axis of the standard gauge $d_1$ to be aligned to the first indicative line and the third indicative line; controlling the movable cantilever beam sensor to move towards the fixed cantilever beam sensor to clamp the standard gauge $d_1$; when the strain signal measured by the displacement-deformation sensing circuit is $\varepsilon_{rd} = \varepsilon_{rd_1}$ or $\varepsilon_{rd} \approx \varepsilon_{rd_1}$, stopping moving the movable cantilever beam sensor, and recording the current strain signal $\varepsilon_{rd}$ to be $\varepsilon^*_{rd_1}$, defining the position of the movable cantilever beam sensor to be the deformation measurement indication position $P_b$; recording the current position of the toothed disc, and defining the current position to be the deformation measurement indication point of the toothed disc; lifting up the movable cantilever beam sensor to a proper height, using the standard gauge $d_2$ to replace the standard gauge $d_1$, adjusting the movable cantilever beam sensor to the deformation measurement indication position $P_b$ again, and recording the current strain signal $\varepsilon^*_{rd_2}$ of the displacement-deformation sensing circuit; sequentially using the standard gauges $d_3$, . . . , and $d_n$ to repeatedly complete the above operations to obtain the corresponding strain signal $\varepsilon^*_{rd_3}$, . . . , and $\varepsilon^*_{rd_n}$ by the displacement-deformation sensing circuit; wherein, when the movable cantilever beam sensor and the fixed cantilever beam sensor clamp the standard gauge $d_n$, the space between the upper jaw of the movable cantilever beam sensor and the lower jaw of the fixed cantilever beam sensor varies corresponding to their natural space; defining the space between the upper jaw and the lower jaw at the first indicative line and the third indicative line to be a jaw deformation space $v_x$; utilizing $\varepsilon^*_{rd_1}$, $\varepsilon^*_{rd_2}$, . . . , and $\varepsilon^*_{rd_n}$ as the calibration numbers, and using the linear fitting method to obtain the functional relationship of $v_x$ and $\varepsilon_{rd}$, namely formula (10):

$$v_x = \frac{\varepsilon_{rd} - B_3}{A_3} \quad (10)$$

in formula (10), $A_3$ and $B_3$ are constants and are respectively calculated by formulae (11) and (12):

$$A_3 = \frac{n\sum_i^n d_i \varepsilon^*_{rd_i} - \sum_i^n d_i \sum_i^n \varepsilon^*_{rd_i}}{n\sum_i^n d_i^2 - \left(\sum_i^n d_i\right)^2} \quad (11)$$

$$B_3 = \frac{\sum_i^n \varepsilon^*_{rd_i} \sum_i^n d_i^2 - \sum_i^n d_i \sum_i^n d_i \varepsilon^*_{rd_i}}{n\sum_i^n d_i^2 - \left(\sum_i^n d_i\right)^2} \quad (12)$$

in formulae (11) and (12), $d_i$ represents the diameters of the standard cylinders with different diameters, $\varepsilon^*_{rd_i}$ represents the strain reading corresponding to, namely the calibration numbers $\varepsilon^*_{rd_1}$, $\varepsilon^*_{rd_2}$, ..., and $\varepsilon^*_{rd_n}$;

(5), diameter measurement of the test piece: adjusting the movable cantilever beam sensor to a proper height, horizontally putting the test piece between the fixed cantilever beam sensor and the movable cantilever beam sensor, and ensuring an axis of the test piece to be aligned to the second indicative line and the fourth indicative line; controlling the movable cantilever beam sensor to move towards the fixed cantilever beam sensor such that the upper clamping blade block and the lower clamping blade block clamp the test piece; when the strain signal measured by the displacement-deformation sensing circuit is $\varepsilon_{rd}=\varepsilon_{rd_0}$ or $\varepsilon_{rd}\approx\varepsilon_{rd_0}$, recording the displacement amount s of the movable cantilever beam sensor corresponding to the diameter measurement indication position P.sub.d; using formula (13) to calculate the diameter of the test piece:

$$d = \frac{\varepsilon_{rd} - B_2}{A_2} + s \quad (13)$$

in formula (13), s is an algebraic value; when the movable cantilever beam sensor moves towards the upper portion of the diameter measurement indication position, the symbol of s is "+"; when the movable cantilever beam sensor moves towards the lower portion of the diameter measurement indication position, the symbol of s is "−";

(6), tensile test:
a. mounting the test piece: adjusting the loading beam space l according to the length of the test piece, putting the test piece between the upper jaw of the movable cantilever beam sensor and the lower jaw of the fixed cantilever beam sensor, ensuring the axis of the test piece to be aligned to the first indicative line and the third indicative line, and screwing down the locking screws ands to ensure that the upper jaw and the lower jaw simultaneously tightly clamp the test piece, wherein a section of the mounted test piece located between the upper jaw and the lower jaw is called a test section, the length of the test section is equal to the loading beam space, and is l;
b. determining the original length of the test piece: adjusting the movable cantilever beam sensor to slightly lift up or down by the numerical control unit to ensure that the load of the test piece is zero, that is, the test force F=0; when F=0, defining the length of the test section of the test piece to be the original length $l_0$; calculating $l^0$ by formula (14);

$$l_0 = l_{min} + S_0 = 2u + S_0 \quad (14)$$

in formula (14), when $S_0$ represents F=0, the displacement amount $S_0$ of the movable cantilever beam sensor corresponding to the displacement zero point $P_0$ is calculated by formula (2); when the test piece is under the action of a tensile load, the length l of the test section continuously varies, and the variable l is calculated by formula (15):

$$l = S + v_b = S + \frac{\varepsilon_{rd} - B_3}{A_3} \quad (15)$$

in formula (15), S is the displacement amount of the movable cantilever beam sensor (15) corresponding to the displacement zero point $P_0$, and is calculated by formula (2);
c. testing the load: setting the loading speed by the numerical control unit, namely, the movement speed of the movable cantilever beam sensor (15); applying the tensile load to the test piece (13); using the numerical control unit to synchronously track and record the variation of the load F of the test piece (13) and the length l of the test section, obtaining the force F of the test piece (13) in real time based on formula (4), and obtaining the length l of the test section of the test piece (13) based on formula (15); using real time data of F and l to draw an F–l relation curve, namely a tensile test curve of the test piece (13).

* * * * *

UNITED STATES PATENT AND TRADEMARK OFFICE
CERTIFICATE OF CORRECTION

| | |
|---|---|
| PATENT NO. | : 11,513,043 B2 |
| APPLICATION NO. | : 16/986711 |
| DATED | : November 29, 2022 |
| INVENTOR(S) | : Shuying Qu et al. |

It is certified that error appears in the above-identified patent and that said Letters Patent is hereby corrected as shown below:

In the Claims

Column 29, Line 49, in Claim 1 should be:
- is - instead of s

Column 36, Line 16, in Claim 1 should be:
- $d_0$ - instead of do

Signed and Sealed this
Fifth Day of December, 2023

Katherine Kelly Vidal
*Director of the United States Patent and Trademark Office*